United States Patent
Nii et al.

(10) Patent No.: US 10,202,227 B2
(45) Date of Patent: Feb. 12, 2019

(54) PLASTICIZER BLEND FOR CHLORINE STABILITY OF WATER-SOLUBLE FILMS

(71) Applicant: MONOSOL, LLC, Merrillville, IN (US)

(72) Inventors: Shinsuke Nii, Merrillville, IN (US); Nathanael R. Miranda, Merrillville, IN (US)

(73) Assignee: MONOSOL, LLC, Merrillville, IN (US)

( * ) Notice: Subject to any disclaimer, the term of this patent is extended or adjusted under 35 U.S.C. 154(b) by 0 days.

(21) Appl. No.: 15/665,810

(22) Filed: Aug. 1, 2017

(65) Prior Publication Data

US 2018/0029763 A1    Feb. 1, 2018

Related U.S. Application Data

(60) Provisional application No. 62/369,742, filed on Aug. 1, 2016.

(51) Int. Cl.
| | |
|---|---|
| B65D 65/46 | (2006.01) |
| B65D 75/40 | (2006.01) |
| C02F 1/68 | (2006.01) |
| C02F 1/76 | (2006.01) |
| C08J 5/18 | (2006.01) |
| C08K 5/00 | (2006.01) |
| C08K 5/053 | (2006.01) |
| C02F 103/42 | (2006.01) |

(52) U.S. Cl.
CPC ............ B65D 65/46 (2013.01); B65D 75/40 (2013.01); C02F 1/687 (2013.01); C02F 1/76 (2013.01); C08J 5/18 (2013.01); C08K 5/0016 (2013.01); C08K 5/053 (2013.01); C02F 2103/42 (2013.01); C08J 2329/04 (2013.01)

(58) Field of Classification Search
CPC .. B65D 65/46; B65D 75/40; C08J 5/18; C08J 2329/04; C02F 1/687; C02F 1/76; C02F 2103/42
See application file for complete search history.

(56) References Cited

U.S. PATENT DOCUMENTS

| | | |
|---|---|---|
| 2,220,099 A | 11/1940 | Guenther et al. |
| 2,477,383 A | 7/1949 | Lewis |
| 3,607,812 A | 9/1971 | Takigawa et al. |
| 3,664,961 A | 5/1972 | Norris |
| 3,919,678 A | 11/1975 | Penfold |
| 3,929,678 A | 12/1975 | Laughlin et al. |
| 3,975,280 A | 8/1976 | Hachmann et al. |
| 4,000,093 A | 12/1976 | Nicol et al. |
| 4,075,116 A | 2/1978 | Mesaros |
| 4,222,905 A | 9/1980 | Cockrell, Jr. |
| 4,239,659 A | 12/1980 | Murphy |
| 4,246,612 A | 1/1981 | Berry et al. |
| 4,259,217 A | 3/1981 | Murphy |
| 4,747,976 A | 5/1988 | Yang et al. |
| 4,810,410 A | 3/1989 | Diakun et al. |
| 4,885,105 A | 12/1989 | Yang et al. |
| 5,114,611 A | 5/1992 | Van Kralingen et al. |
| 5,137,646 A | 8/1992 | Schmidt et al. |
| 5,227,084 A | 7/1993 | Martens et al. |
| 5,340,496 A | 8/1994 | Sato et al. |
| 5,342,876 A | 8/1994 | Abe et al. |
| RE34,988 E | 7/1995 | Yang et al. |
| 5,576,281 A | 11/1996 | Bunch et al. |
| 6,599,871 B2 | 7/2003 | Smith |
| 6,657,004 B2 | 12/2003 | Mizutani |
| 6,956,070 B2 | 10/2005 | Fujiwara et al. |
| 7,022,656 B2 | 4/2006 | Verrall et al. |
| 7,067,575 B2 | 6/2006 | Kitamura et al. |
| 7,745,517 B2 | 6/2010 | Vicari et al. |
| 7,754,318 B2 | 7/2010 | Kitamura et al. |
| 8,728,593 B2 | 5/2014 | Vicari et al. |
| 9,611,367 B2 | 4/2017 | Takafuji et al. |
| 2003/0060390 A1 | 3/2003 | Demeyere et al. |
| 2003/0126282 A1 | 7/2003 | Sarkar et al. |
| 2003/0139312 A1 | 7/2003 | Caswell et al. |
| 2004/0204337 A1 | 10/2004 | Corona et al. |
| 2005/0010010 A1 | 1/2005 | Kitamura et al. |
| 2007/0034575 A1 | 2/2007 | Tufano et al. |
| 2007/0219111 A1 | 9/2007 | Ward et al. |
| 2008/0146481 A1 | 6/2008 | Brown et al. |
| 2009/0291282 A1 | 11/2009 | Kitamura et al. |

(Continued)

FOREIGN PATENT DOCUMENTS

| | | |
|---|---|---|
| EP | 0 197 434 B1 | 7/1989 |
| EP | 0354410 A2 | 2/1990 |

(Continued)

OTHER PUBLICATIONS

International Application No. PCT/US2017/044790, International Search Report and Written Opinion, dated Oct. 20, 2017.
Database WPI, Week 200243, AN 2002-398250 (Jan. 23, 2002).

Primary Examiner — Michael C Miggins
(74) Attorney, Agent, or Firm — Marshall, Gerstein & Borun LLP

(57) ABSTRACT

Disclosed herein are water-soluble films comprising a mixture of a water-soluble polyvinyl alcohol copolymer including an anionic monomer having a pendant carboxyl group, and a plasticizer blend comprising a first plasticizer comprising sorbitol and a secondary plasticizer selected from the group consisting of glycerol, trimethylolpropane, diglycerol, glycerol propylene oxide polymers, glycerol diacetate, 2-methyl-1,3-propanediol and a combination thereof, wherein (i) when the total plasticizer in the film is less than 12 PHR, then the plasticizer blend comprises sorbitol, glycerol, and at least one additional secondary plasticizer; (ii) when the total plasticizer in the film is at least 12 PHR and less than 20 PHR, then the plasticizer blend comprises sorbitol, glycerol, and at least one additional secondary plasticizer selected from diglycerol, trimethylolpropane and a combination thereof; and (iii) when the total plasticizer in the film is 20 PHR or greater, then sorbitol comprises at least ⅓ of the total plasticizer.

358 Claims, No Drawings

(56) References Cited

U.S. PATENT DOCUMENTS

| | | |
|---|---|---|
| 2011/0186467 A1 | 8/2011 | Denome et al. |
| 2011/0189413 A1 | 8/2011 | Denome et al. |
| 2013/0206638 A1 | 8/2013 | Wong et al. |
| 2013/0240388 A1 | 9/2013 | Koch et al. |
| 2014/0110301 A1 | 4/2014 | Carrier et al. |
| 2014/0162929 A1 | 6/2014 | Labeque et al. |
| 2016/0102278 A1 | 4/2016 | Labeque et al. |
| 2016/0102279 A1 | 4/2016 | Labeque et al. |
| 2016/0280869 A1 | 9/2016 | Nii et al. |
| 2016/0369072 A1 | 12/2016 | Yamaguchi |
| 2017/0218146 A1 | 8/2017 | Childers et al. |
| 2017/0233539 A1 | 8/2017 | Friedrich et al. |
| 2017/0275394 A1 | 9/2017 | Mori et al. |

FOREIGN PATENT DOCUMENTS

| | | |
|---|---|---|
| EP | 0414 549 A2 | 2/1991 |
| EP | 1418196 A1 | 5/2004 |
| EP | 1466938 A1 | 10/2004 |
| EP | 2088187 A1 | 8/2009 |
| EP | 2258820 A1 | 12/2010 |
| EP | 2397539 A1 | 12/2011 |
| GB | 1 137 741 A | 12/1968 |
| GB | 1 466 799 A | 3/1977 |
| JP | H02124945 A | 5/1990 |
| JP | 2002020569 A | 1/2002 |
| JP | 3784533 B2 | 6/2006 |
| JP | 4611157 B2 | 1/2011 |
| WO | WO-93/08874 A1 | 5/1993 |
| WO | WO-93/08876 A1 | 5/1993 |
| WO | WO-94/22800 A1 | 10/1994 |
| WO | WO-2009/152031 A1 | 12/2009 |
| WO | WO-2014/151718 A2 | 9/2014 |
| WO | WO-2016/061026 A1 | 4/2016 |

PLASTICIZER BLEND FOR CHLORINE STABILITY OF WATER-SOLUBLE FILMS

CROSS-REFERENCE TO RELATED APPLICATIONS

This application claims the benefit under 35 U.S.C. § 119(e) of U.S. Provisional Patent Application Ser. No. 62/369,742, filed Aug. 1, 2016, which is hereby incorporated by reference in its entirety.

FIELD OF THE INVENTION

The present disclosure relates generally to water-soluble films and related packets. More particularly the disclosure relates to polyvinyl alcohol based water-soluble films compatible with harsh chemicals and suitable for vertical form, fill, and seal processing.

BACKGROUND

Water-soluble polymeric films are commonly used as packaging materials to simplify dispersing, pouring, dissolving and dosing of a material to be delivered. A consumer can directly add the pouched composition to a mixing vessel, such as a bucket, sink or any vessel suitable for holding water. Advantageously, this provides for accurate dosing while eliminating the need for the consumer to measure the composition. The pouched composition may also reduce mess that would be associated with dispensing a material from a product container, such as pouring or scooping a material. In sum, soluble pre-measured polymeric film pouches provide for convenience of consumer use in a variety of applications.

Water-soluble polymeric films that are used to make currently marketed pouches would be useful for containing harsh chemicals. Notably, a unit dose pouch comprising such chemicals would be particularly advantageous to protect the consumer from directly contacting such chemicals. However, water-soluble polymers, and their resulting films, may incompletely dissolve after prolonged exposure to a harsh chemical contained therein. Such problems may particularly arise when the pouch is used, for example, to contain harsh oxidizing compounds, such as chlorinated compounds. Further, as disclosed in U.S. Pat. No. 7,067,575, certain plasticizers have a substantial negative effect on solubility when the films are exposed to oxidizing agents. However, reducing the amount of plasticizer in the water-soluble film has a detrimental effect on the formability of the water-soluble film (e.g., vertical form, fill, and seal; thermoformability).

Thus, there exists a need in the art for a water soluble film that can be formed into water soluble packages for holding harsh oxidizing chemicals, such as chlorinated compounds, and remain water soluble after being stored in contact with such oxidizing chemicals.

SUMMARY

One aspect of the disclosure provides a plasticized water-soluble film including a mixture of a water-soluble polyvinyl alcohol copolymer, the copolymer including an anionic monomer having a pendant carboxyl group, the mixture further including a plasticizer blend including a first plasticizer including sorbitol and a secondary plasticizer, e.g. selected from the group consisting of glycerol, trimethylolpropane, diglycerol, glycerol propylene oxide polymers, glycerol diacetate, 2-methyl-1,3-propanediol and a combination thereof, wherein (i) when the total amount of plasticizer included in the film is less than 12 PHR, then the plasticizer blend includes sorbitol, glycerol, and at least one additional secondary plasticizer; (ii) when the total amount of plasticizer included in the film is at least 12 PHR and less than 20 PHR, then the plasticizer blend includes sorbitol, glycerol, and at least one additional secondary plasticizer selected from diglycerol, trimethylolpropane and a combination thereof; and (iii) when the total amount of plasticizer included in the film is 20 PHR or greater, then the sorbitol makes up at least ⅓ of the total amount of plasticizer (by weight).

Another aspect of the disclosure provides a sealed article including the water-soluble film of the disclosure, e.g. a pouch or packet having the water-soluble film as at least one wall of the pouch or packet.

Another aspect of the disclosure provides such a sealed pouch including the water soluble film of the disclosure, the pouch enclosing or otherwise containing an oxidizing composition.

For the compositions described herein, optional features, including but not limited to components and compositional ranges thereof, are contemplated to be selected from the various aspects, embodiments, and examples provided herein.

Further aspects and advantages will be apparent to those of ordinary skill in the art from a review of the following detailed description. While the film, pouch, and their methods of making are susceptible of embodiments in various forms, the description hereafter includes specific embodiments with the understanding that the disclosure is illustrative, and is not intended to limit the invention to the specific embodiments described herein.

DETAILED DESCRIPTION

One aspect of the disclosure provides a water-soluble film including a mixture of a water-soluble polyvinyl alcohol copolymer, the copolymer including an anionic monomer having a pendant carboxyl group, the mixture further including a plasticizer blend including a first plasticizer including sorbitol and a secondary plasticizer selected from the group consisting of glycerol, trimethylolpropane, diglycerol, glycerol propylene oxide polymers, glycerol diacetate, 2-methyl-1,3-propanediol and a combination thereof, wherein (i) when the total amount of plasticizer included in the film is less than 12 PHR, then the plasticizer blend includes sorbitol, glycerol, and at least one additional secondary plasticizer; (ii) when the total amount of plasticizer included in the film is at least 12 PHR and less than 20 PHR, then the plasticizer blend includes sorbitol, glycerol, and at least one additional secondary plasticizer selected from diglycerol, trimethylolpropane and a combination thereof; and (iii) when the total amount of plasticizer included in the film is 20 PHR or greater, then the sorbitol makes up at least ⅓ of the total amount of plasticizer (by weight).

Optionally, when glycerol is included in the film, it may be included in an amount of at least 2.0 wt. %, based on the total weight of the film. Optionally, the total amount of plasticizer in the film is at least 2 PHR, at least 5 PHR, or at least 6.5 PHR. Optionally, the total amount of plasticizer is less than about 12 PHR, less than about 10 PHR, less than about 8 PHR, or less than about 7.5 PHR based on total resin in the film. Optionally, the total amount of plasticizer in the film is in a range of about 15 to about 20 PHR, or about 16 to 18 PHR, based on the total resin in the film. Further optionally, the total amount of plasticizer in the film is in a range of about 21 PHR to about 27 PHR, or about 23 to 25 PHR, based on total resin in the film.

In embodiments, the anionic monomer unit is selected from the group consisting of vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, alkali metal salts of the foregoing, esters of the foregoing, and combinations of the foregoing. Optionally, the anionic monomer unit comprises one or more of maleic acid, monoalkyl maleate, dialkyl maleate, monomethyl maleate, dimethyl maleate, maleic anhydride, alkali metal salts of the foregoing, esters of the forgoing, and combinations thereof. Further optionally, the anionic monomer unit is selected from the group consisting of maleic acid, monomethyl maleate, dimethyl maleate, maleic anhydride, alkali metal salts of the foregoing, esters of the foregoing, and combinations thereof.

In embodiments, the PVOH copolymer has a degree of hydrolysis in a range of 87 to 98, or 89 to 97, or 90 to 96. Optionally, the PVOH copolymer has a degree of hydrolysis in a range of 94 to 98. Optionally, the PVOH copolymer has a degree of hydrolysis of about 96.

In embodiments, the water soluble film of the disclosure further includes an antioxidant. Optionally, the antioxidant is selected from the group consisting of sodium metabisulfite, propyl gallate, citric acid, and combinations thereof. In embodiments, the water soluble film of the disclosure further includes a filler, a surfactant, an anti-block agent or combinations of the foregoing.

In embodiments, a water soluble film of the disclosure having a thickness of about 2 mil (about 0.05 mm), dissolves in 600 seconds or less in water at a temperature of 20° C. (68° F.) in accordance with MonoSol Test Method MSTM-205 after storing in contact with a harsh chemical oxidizing agent for 6 weeks at 23° C. and 35% relative humidity (RH).

In embodiments, the anionic monomer comprises monomethyl maleate, the total plasticizer present in the film is in a range of 7 to 8 PHR, and the plasticizer blend consists essentially of glycerol, sorbitol, and trimethylolpropane.

In embodiments, the anionic monomer comprises monomethyl maleate, the total plasticizer present in the film is in a range of 24 to 25 PHR, and the plasticizer blend consists essentially of a 1:1 wt % mixture of glycerol and sorbitol.

In embodiments, the anionic monomer comprises monomethyl maleate, the total plasticizer present in the film is in a range of 24 to 25 PHR, and the plasticizer blend consists essentially of a 1:1 wt % mixture of trimethylolpropane and sorbitol.

In embodiments, the anionic monomer comprises monomethyl maleate, the total plasticizer present in the film is in a range of 24 to 25 PHR, and the plasticizer blend consists essentially of a 1:1:1 wt % mixture trimethylolpropane, glycerol and sorbitol.

In embodiments, the anionic monomer comprises monomethyl maleate, the total plasticizer present in the film is in a range of 16.5 to 17.5 PHR, and the plasticizer blend consists essentially of glycerol, sorbitol, and diglycerol.

In embodiments, the anionic monomer comprises monomethyl maleate, the total plasticizer present in the film is in a range of 16.5 to 17.5 PHR, and the plasticizer blend consists essentially of glycerol, sorbitol, and trimethylolpropane.

Another aspect of the disclosure provides a sealed article including the water-soluble film of the disclosure. Optionally, the article is a vertical form, filled, and sealed article.

Another aspect of the disclosure provides a sealed pouch including the water soluble film of the disclosure, the pouch enclosing an oxidizing composition. Optionally, the pouch is a vertical form, filled, and sealed pouch.

In embodiments, the oxidizing composition is a chlorinated or brominated composition. Optionally, the oxidizing agent comprises an oxidizing agent selected from the group consisting of sodium hypochlorite, calcium hypochlorite, and lithium hypochlorite, dichloroisocyanuric acid, trichloroisocyanuric acid, trichloroisocyanurate (TC), salts and hydrates of the foregoing, 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin (BCDMH), 2-bromo-2-nitro-1,3-propanediol, and combinations thereof. Optionally, the oxidizing agent comprises an oxidizing agent selected from the group consisting of trichloroisocyanurate, 1-bromo-3-chloro-5,5-dimethylhydantoin, and combinations thereof.

In embodiments, the pouch has an interior volume of at least about 25 ml, or at least about 100 ml, or at least about 150 ml, or at least about 200 ml, or at least about 250 ml, or at least about 300 ml. Optionally, the pouch interior volume can be 200 L or less, or 100 L or less, or 10 L or less, or 5 L or less. In embodiments, the pouch has a length of at least about 12.5 cm (about 5 inches), at least about 18 cm (about 7 inches), or at least about 23 cm (about 9 inches). Optionally, the pouch has a length of 10 m or less, or 5 m or less, or 1 m or less.

"Comprising" as used herein means that various components, ingredients or steps that can be conjointly employed in practicing the present disclosure. Accordingly, the term "comprising" encompasses the more restrictive terms "consisting essentially of" and "consisting of." The present compositions can comprise, consist essentially of, or consist of any of the required and optional elements disclosed herein. For example, a thermoformed packet can "consist essentially of" a film described herein for use of it thermoforming characteristics, while including a non-thermoformed film (e.g., lid portion), and optional markings on the film, e.g. by inkjet printing. The invention illustratively disclosed herein suitably may be practiced in the absence of any element or step which is not specifically disclosed herein.

To be considered a water-soluble film according to the present disclosure, the film, at a thickness of about 2 mil (about 0.05 mm), after storing in contact with a harsh chemical oxidizing agent such as trichloroisocyanurate (TC) or 1-bromo-3-chloro-5,5-dimethylhydantoin (BCDMH) for 6 weeks at 23° C. and 35% RH dissolves in 600 seconds or less in water at a temperature of 20° C. (68° F.) in accordance with MonoSol Test Method MSTM-205, described below. Trichloroisocyanurate is generally considered a strong chloro-containing oxidizing agent useful as a disinfectant, algicide, and bactericide and is widely used in civil sanitation for pools and spas. Trichloroisocyanurate upon dissolution releases some of the chlorine as hypochlorous acid, the balance remaining as "reservoir chlorine" in the form of chlorinated isocyanurates. When the released hypochlorous acid is used up, the equilibrium shifts and additional hypochlorous acid is released from the "reservoir" until all available chlorine is used up. 1-bromo-3-chloro-5,5-dimethylhydantoin (BCDMH) is an excellent source of both chlorine and bromine as it reacts slowly with water releasing hypochlorous acid and hypobromous acid. It is used as a chemical disinfectant for recreational water and drinking water purification.

All percentages, parts and ratios referred to herein are based upon the total dry weight of the film composition or total weight of the packet content composition of the present disclosure, as the case may be, and all measurements made are at about 25° C., unless otherwise specified. All such weights as they pertain to listed ingredients are based on the active level and therefore do not include carriers or by-products that may be included in commercially available materials, unless otherwise specified.

All ranges set forth herein include all possible subsets of ranges and any combinations of such subset ranges. By default, ranges are inclusive of the stated endpoints, unless stated otherwise. Where a range of values is provided, it is understood that each intervening value between the upper and lower limit of that range and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also contemplated to be part of the disclosure.

It is expressly contemplated that for any number value described herein, e.g. as a parameter of the subject matter described or part of a range associated with the subject matter described, an alternative which forms part of the description is a functionally equivalent range surrounding the specific numerical value (e.g. for a dimension disclosed as "40 mm" an alternative embodiment contemplated is "about 40 mm").

As used herein, the terms packet(s) and pouch(es) should be considered interchangeable. In certain embodiments, the terms packet(s) and pouch(es), respectively, are used to refer to a container made using the film and a sealed container preferably having a material sealed therein, e.g., in the form a measured dose delivery system. The sealed pouches can be made from any suitable method, including such processes and features such as heat sealing, solvent welding, and adhesive sealing (e.g., with use of a water-soluble adhesive).

As used herein and unless specified otherwise, the terms "wt. %" and "wt %" are intended to refer to the composition of the identified element in "dry" (non water) parts by weight of the entire film, including residual moisture in the film (when applicable) or parts by weight of the entire composition enclosed within a pouch (when applicable).

As used herein and unless specified otherwise, the term "PHR" ("phr") is intended to refer to the composition of the identified element in parts per one hundred parts water-soluble polymer resin (whether PVOH or other polymer resin) in the water-soluble film.

The film includes a water-soluble polyvinyl alcohol (PVOH) copolymer resin and a plasticizer.

The film can be made by any suitable method, including a solution casting method. The film can be used to form a container (pouch) by any suitable process, including vertical form, fill, and sealing (VFFS) or thermoforming and, for example, solvent sealing or heat sealing of film layers around a periphery of the container. The pouches can be used for dosing materials to be delivered into bulk water, for example.

The film, pouches, and related methods of making and use are contemplated to include embodiments including any combination of one or more of the additional optional elements, features, and steps further described below (including those shown in the Examples and figures), unless stated otherwise.

Water-Soluble Film

The film and related pouches described herein comprise a plasticized, water-soluble film. In one aspect, the water-soluble film comprises a total of at least about 50 wt % of a PVOH resin comprising one or more PVOH polymers that optionally includes a PVOH copolymer. The film can have any suitable thickness, and a film thickness of about 76 microns (µm) is typical and particularly contemplated. Other values and ranges contemplated include values in a range of about 5 to about 200 µm, or in a range of about 20 to about 100 µm, or about 40 to about 90 µm, or about 50 to 80 µm, or about or about 60 to 65 µm for example 50 µm, 65 µm, 76 µm, or 88 µm.

PVOH Resin

The film described herein includes one or more polyvinyl alcohol (PVOH) polymers to make up the PVOH resin content of the film, and can include a PVOH copolymer resin.

Polyvinyl alcohol is a synthetic resin generally prepared by the alcoholysis, usually termed hydrolysis or saponification, of polyvinyl acetate. Fully hydrolyzed PVOH, where virtually all the acetate groups have been converted to alcohol groups, is a strongly hydrogen-bonded, highly crystalline polymer which dissolves only in hot water—greater than about 140° F. (about 60° C.). If a sufficient number of acetate groups are allowed to remain after the hydrolysis of polyvinyl acetate, that is the PVOH polymer is partially hydrolyzed, then the polymer is more weakly hydrogen-bonded, less crystalline, and is generally soluble in cold water—less than about 50° F. (about 10° C.). As such, the partially hydrolyzed polymer is a vinyl alcohol-vinyl acetate copolymer that is a PVOH copolymer, but is commonly referred to as PVOH.

In particular, the PVOH resin will include a partially or fully hydrolyzed PVOH copolymer that includes an anionic monomer unit, a vinyl alcohol monomer unit, and optionally a vinyl acetate monomer unit.

General classes of anionic monomer units which can be used for the PVOH copolymer include the vinyl polymerization units corresponding to monocarboxylic acid vinyl monomers, their esters and anhydrides, dicarboxylic monomers having a polymerizable double bond, their esters and anhydrides, and alkali metal salts of any of the foregoing. In various embodiments, the anionic monomer can be one or more of vinyl acetic acid, alkyl acrylates, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, citraconic acid, monoalkyl citraconate, dialkyl citraconate, citraconic anhydride, mesaconic acid, monoalkyl mesaconate, dialkyl mesaconate, mesaconic anhydride, glutaconic acid, monoalkyl glutaconate, dialkyl glutaconate, glutaconic anhydride, vinyl sulfonic acid, alkyl sulfonic acid, ethylene sulfonic acid, 2-acrylamido-1-methyl propane sulfonic acid, 2-acrylamide-2-methylpropanesulfonic acid, 2-methylacrylamido-2-methylpropanesulfonic acid, 2-sulfoethyl acrylate, alkali metal salts of the foregoing (e.g., sodium, potassium, or other alkali metal salts), esters of the foregoing (e.g., methyl, ethyl, or other $C_1$-$C_4$ or $C_6$ alkyl esters), and combinations of the foregoing (e.g., multiple types of anionic monomers or equivalent forms of the same anionic monomer). For example, the anionic monomer can include one or more of monomethyl maleate and alkali metal salts thereof (e.g. sodium salts). In embodiments, the anionic monomer can be selected from the group consisting of vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, alkali metal salts of the foregoing, esters of the foregoing, and combinations of the foregoing.

In one type of embodiment, the PVOH is a carboxyl group modified copolymer. In another aspect, the PVOH can be modified with a dicarboxyl type monomer. In one class of these embodiments, the α carbon of both carbonyls are connected to the unsaturated bond (e.g., maleic acid, fumaric acid). In another class of these embodiments, the α carbon of both carbonyls are connected to the unsaturated bond and the unsaturated bond is further substituted, e.g., with a methyl branch (e.g., citraconic acid, mesaconic acid). In another class of these embodiments, the β carbon of one carbonyl and the α carbon of the other carbonyl are connected to the unsaturated bond (e.g., itaconic acid, cis-glutaconic acid, trans-glutaconic acid). Monomers that provide alkyl carboxyl groups are contemplated. A maleic acid type (e.g., maleic acid, dialkyl maleate (including dimethyl maleate), monoalkyl maleate (including monomethyl maleate), or maleic anhydride) comonomer is particularly contemplated. In embodiments, the anionic monomer unit is selected from the group consisting of maleic acid, monoalkyl maleate, dialkyl maleate, monomethyl maleate, dimethyl maleate, maleic anhydride, alkali metal salts of the foregoing, esters of the foregoing, and combinations thereof. In embodiments, the anionic monomer unit is selected from the group consisting of maleic acid, monomethyl maleate, dimethyl maleate, maleic anhydride, alkali metal salts of the foregoing, esters of the foregoing, and combinations thereof.

When the PVOH resin comprises a PVOH copolymer including an anionic monomer, the level of incorporation of the one or more anionic monomer units in the PVOH copolymer is not particularly limited. In embodiments, the one or more anionic monomer units are present in the PVOH copolymer in an amount in a range of about 1 mol. % to 10 mol. %, or 1.5 mol. % to about 8 mol. %, or about 2 mol. % to about 6 mol. %, or about 3 mol. % to about 5 mol. %, or about 1 mol. % to about 4 mol. % (e.g., at least 1.0, 1.5, 2.0, 2.5, 3.0, 3.5, or 4.0 mol. % and/or up to about 3.0, 4.0, 4.5, 5.0, 6.0, 8.0, or 10 mol. % in various embodiments).

PVOH copolymers including anionic monomers can also be characterized by the level of pendant anionic groups present in the copolymer. The level of pendant anionic groups in the PVOH copolymers is not particularly limited. In embodiments, the pendant anionic groups are present in the PVOH copolymer in an amount in a range of about 1% to 20%, or 1.5% to 8%, or 2% to 12%, or 2% to 10%, or at least 2.5%, or at least 3%, or at least 3.5%, for example 2%, 3%, 6%, or 8%.

In embodiments, the amount of PVOH copolymers in the film can be in a range of at least about 50 wt. %, 55 wt. %, 60 wt. %, 65 wt. %, 70 wt. %, 75 wt. %, 80 wt. %, 85 wt. %, or 90 wt. % and/or up to about 60 wt. %, 70 wt. %, 80 wt. %, 90 wt. %, 95 wt. %, or 99 wt. %. If two liquid plasticizers are used, a range of about 75% to about 80% PVOH copolymers is particularly contemplated, for example 76%, 77%, or 78%. If two solid plasticizers are used, a range of about 65% to about 75% PVOH copolymers is particularly contemplated, for example 67%, 68%, 69%, 70%, 71%, or 72%.

In embodiments, the total PVOH resin content of the film can have a degree of hydrolysis (D.H. or DH) of at least 80%, 84% or 85% and at most about 99.7%, 98%, 96%, or 80%, for example in a range of about 80% to 99.7%, or 84% to about 90%, or 85% to 88%, or 86.5%, or 88% to 90%, or 94% to 98%, or 85% to 99.7%, or 87% to 98%, or 89% to 97%, or 90% to 96%, for example 90%, 92%, 94%, or 96%. As used herein, the degree of hydrolysis is expressed as a mole percentage of vinyl acetate units converted to vinyl alcohol units.

Without intending to be bound by theory it is believed that the hypochlorite ions produced by the chlorinated agents oxidize the pendant hydroxyl (—OH) moieties in the PVOH copolymer film, creating carbonyl groups on the polymer backbone. Additionally, hydrochloric acid produced by the chlorinated agent may react with the hydroxyl group to create unsaturated bonds in the polymer backbone, which causes discoloration in the film. In either event, the removal of the pendant —OH groups makes the films increasingly insoluble in water.

Accordingly, without intending to be bound by theory, it is believed that polyvinyl alcohol resins having a higher degree of hydrolysis (e.g., at least 90%, at least 96%) are advantageous for water-soluble films of the disclosure because the large amount of —OH groups present allows some —OH groups to act as "sacrificial" moieties to the chlorinated agents contained in the pouches of the disclosure, while still maintaining enough —OH groups to allow the pouches to be water soluble.

Viscosity

The viscosity of a PVOH polymer ($\mu$) is determined by measuring a freshly made solution using a Brookfield LV type viscometer with UL adapter as described in British Standard EN ISO 15023-2:2006 Annex E Brookfield Test method. It is international practice to state the viscosity of 4% aqueous polyvinyl alcohol solutions at 20° C. All viscosities specified herein in Centipoise (cP) should be understood to refer to the viscosity of 4% aqueous polyvinyl alcohol solution at 20° C., unless specified otherwise. Similarly, when a resin is described as having (or not having) a particular viscosity, unless specified otherwise, it is intended that the specified viscosity is the average viscosity for the resin, which inherently has a corresponding molecular weight distribution.

In embodiments, the PVOH resin can have a viscosity average of at least about 10 cP, 12 cP, 13 cP, 13.5 cP, 14 cP, 15 cP, 16 cP, or 17 cP and at most about 30 cP, 28 cP, 27 cP, 26 cP, 24 cP, 22 cP, 20 cP, 19 cP, 18 cP, or 17.5 cP, for example in a range of about 10 cP to about 30 cP, or about 13 cP to about 27 cP, or about 13.5 cP to about 20 cP, or about 18 cP to about 22 cP, or about 14 cP to about 19 cP, or about 16 cP to about 18 cP, or about 17 cP to about 16 cP, for example 23 cP, or 20 cP, or 16.5 cP. It is well known in the art that the viscosity of PVOH resins is correlated with the weight average molecular weight ($\overline{M}w$) of the PVOH resin, and often the viscosity is used as a proxy for the $\overline{M}w$.

Other Water Soluble Polymers

Other water soluble polymers for use in addition to the PVOH copolymer film can include, but are not limited to a vinyl alcohol-vinyl acetate copolymer, sometimes referred to as a PVOH homopolymer, polyacrylates, water-soluble acrylate copolymers, polyvinyl pyrrolidone, polyethyleneimine, pullulan, water-soluble natural polymers including, but not limited to, guar gum, gum Acacia, xanthan gum, carrageenan, and starch, water-soluble polymer derivatives including, but not limited to, modified starches, ethoxylated starch, and hydroxypropylated starch, copolymers of the forgoing and combinations of any of the foregoing. Yet other water-soluble polymers can include polyalkylene oxides, polyacrylamides, polyacrylic acids and salts thereof, celluloses, cellulose ethers, cellulose esters, cellulose amides, polyvinyl acetates, polycarboxylic acids and salts thereof, polyaminoacids, polyamides, gelatines, methylcelluloses, carboxymethylcelluloses and salts thereof, dextrins, ethylcelluloses, hydroxyethyl celluloses, hydroxypropyl methylcelluloses, maltodextrins, polymethacrylates, and combinations of any of the foregoing. Such water-soluble polymers, whether PVOH or otherwise are commercially available from a variety of sources.

Plasticizers

A plasticizer is a liquid, solid, or semi-solid that is added to a material (usually a resin or elastomer) making that material softer, more flexible (by decreasing the glass-transition temperature of the polymer), and easier to process. A polymer can alternatively be internally plasticized by chemically modifying the polymer or monomer. In addition or in the alternative, a polymer can be externally plasticized by the addition of a suitable plasticizing agent. The combination of plasticizers for the film described herein includes sorbitol as a first plasticizer and a secondary plasticizer selected from the group consisting of glycerol, diglycerol, trimethylolpropane (TMP), glycerol propylene oxide polymers (e.g., Voranol™ 230-660 polyol), glycerol diacetate (diacetin), 2-methyl-1,3-propanediol (MP-Diol) and combinations thereof. In embodiments, the plasticizer includes sorbitol as a first plasticizer, glycerol as a secondary plasticizer, and an additional secondary plasticizer selected from the group consisting of glycerol, trimethylolpropane, and a combination thereof. In one type of embodiment, the water-soluble film will be substantially free from plasticizers other than the than the first and secondary plasticizers (e.g., completely free from other plasticizers, or less than about 1 PHR of other plasticizers, or less than about 0.5 PHR of other plasticizers, or less than about 0.2 PHR of other plasticizers). In other embodiments, the water-soluble film can include further plasticizers (e.g., sugar alcohols, polyols, or otherwise) other than the first and secondary plasticizers.

The plasticizer can include, but is not limited to, glycerol, diglycerol, sorbitol, ethylene glycol, diethylene glycol, triethylene glycol, dipropylene glycol, tetraethylene glycol, propylene glycol, polyethylene glycols up to 400 MW, neopentyl glycol, trimethylolpropane, polyether polyols, sorbitol, 2-methyl-1,3-propanediol (e.g. MP Diol®), ethanolamines, and a mixture thereof. The plasticizer can be selected from glycerol, sorbitol, diglycerol, trimethylolpropane, glycerol propylene oxide polymers, glycerol diacetate, or a combination thereof. The plasticizer can be selected from glycerol, sorbitol, diglycerol, trimethylolpropane, glycerol propylene oxide polymers, glycerol diacetate, 2-methyl-1,3-propanediol or a combination thereof. The plasticizer can be selected from glycerol, sorbitol, diglycerol, trimethylolpropane, or a combination thereof. The plasticizer is a blend that includes at least sorbitol as a first plasticizer. In embodiments, the plasticizer blend includes a secondary plasticizer selected from the group consisting of glycerol, diglycerol, trimethylolpropane, glycerol propylene oxide polymers, glycerol diacetate, 2-methyl-1,3-propanediol and combinations thereof. In embodiments, the plasticizer blend includes a secondary plasticizer selected from glycerol, diglycerol, trimethylolpropane, and combinations thereof. In one type of embodiment, the plasticizer includes glycerol, sorbitol, and trimethylolpropane. In another type of embodiment, the plasticizer includes glycerol, sorbitol, and diglycerol. In another type of embodiment, the plasticizer includes glycerol, sorbitol, and at least one of trimethylolpropane and diglycerol. In yet another type of embodiment the plasticizer blend comprises sorbitol and one of glycerol or trimethylolpropane. The total amount of the plasticizer can be in a range of about 10 wt. % to about 45 wt. %, or about 20 wt. % to about 45 wt. %, or about 15 wt. % to about 35 wt. %, or about 20 wt. % to about 30 wt. %, for example about 25 wt. %, based on total film weight. The total amount of plasticizer can also be expressed in parts per 100 parts resin. Thus, the total amount of plasticizer can be in a range of about 2 PHR to about 30 PHR, about 5 PHR to about 25 PHR, about 2 PHR to about 11 PHR, about 5 PHR to about 10 PHR, about 15 PHR to about 20 PHR, about 16 PHR to about 18 PHR, about 21 PHR to about 27 PHR, about 23 PHR to about 25 PHR, or less than about 25 PHR, less than about 20 PHR, less about 17.5 PHR, less than about 12 PHR, less than about 10 PHR, less than about 8 PHR, less than about 7.5 PHR, or at least 2 PHR, at least 5 PHR, at least 6.5 PHR, at least 10 PHR, or at least 15 PHR. Optionally, glycerol can be used in an amount of at least about 2 wt % up to about 25 wt %, or 3 wt % to about 20 wt %, or about 4 wt. % to about 14 wt. %, or about 6 wt. % to about 12 wt. % e.g., about 9 wt %, for example, about 2 PHR to about 15 PHR, or about 2 PHR to about 10 PHR, or about 4 PHR to about 10 PHR, or about 4 PHR to about 7 PHR, or about 2 PHR to about 5 PHR.

In an aspect of the disclosure, when the total amount of plasticizer is less than about 12 PHR, for example in a range of about 2 PHR to about 11 PHR, or about 5 PHR to about 10 PHR, or about 7 PHR to about 8 PHR, then the plasticizer blend may include sorbitol as a first plasticizer and a second plasticizer comprising glycerol and at least one of diglycerol, trimethylolpropane, glycerol propylene oxide polymers, glycerol diacetate, 2-methyl-1,3-propanediol, or a combination thereof. Optionally, sorbitol can be used in an amount of about 1 PHR to about 3 PHR, or about 1 PHR to about 2 PHR. Optionally, trimethylolpropane, diglycerol, glycerol propylene oxide polymers, glycerol diacetate, and 2-methyl-1,3-propanediol each can be used in an amount of about 2 PHR to about 6 PHR, or about 2 PHR to about 3 PHR, or about 3 PHR to about 5 PHR. Optionally, glycerol can be used in an amount of about 1 PHR to about 4 PHR, or about 1 PHR to about 3 PHR, or about 2 PHR to about 3 PHR. In embodiments, the water soluble film comprises a PVOH/monomethyl maleate copolymer, the total amount of plasticizer present in the film is in a range of about 7 to about 8 PHR, and the plasticizer blend consists essentially of glycerol, sorbitol, and diglycerol. In embodiments, the water soluble film comprises a PVOH/monomethyl maleate copolymer, the total amount of plasticizer present in the film is in a range of about 7 to about 8 PHR, and the plasticizer blend consists essentially of glycerol, sorbitol, and trimethylolpropane.

In another aspect, when the total amount of plasticizer is in a range of about 12 PHR to about 20 PHR, for example, about 15 PHR to about 20 PHR, or about 16 PHR to about 18 PHR, or about 16.5 PHR to about 17.5 PHR then the plasticizer blend may include a combination of sorbitol and glycerol as first and second plasticizers, and at least one additional secondary plasticizer selected from trimethylolpropane, diglycerol, and a combination thereof. Optionally, sorbitol can be used in an amount of about 1 PHR to about 6 PHR, or about 3 PHR to about 6 PHR, or about 2 PHR to about 6 PHR, or about 5 PHR to about 6 PHR. Optionally, trimethylolpropane and diglycerol each can be used in an amount of about 4 PHR to about 10 PHR, or about 4 PHR to about 6 PHR, or about 5 PHR to about 6 PHR, or from about 9 PHR to about 10 PHR. Optionally, glycerol can be used in an amount of about 3 PHR to about 7 PHR, or about 4 PHR to about 6 PHR, or about 5 PHR to about 6 PHR, or about 5 PHR to about 6 PHR. In embodiments, the water soluble film comprises a PVOH/monomethyl maleate copolymer, the total amount of plasticizer present in the film is in a range of about 16.5 PHR to about 17.5 PHR, and the plasticizer blend consists essentially of glycerol, sorbitol, and diglycerol. In embodiments, the water soluble film comprises a PVOH/monomethyl maleate copolymer, the total amount of plasticizer present in the film is in a range of about 16.5 PHR to about 17.5 PHR, and the plasticizer blend consists essentially of glycerol, sorbitol, and trimethylolpropane.

In another aspect, when the total amount of plasticizer is about 20 PHR or greater, for example about 21 PHR to about 27 PHR, or about 23 PHR to about 25 PHR, or about 24 PHR to about 25 PHR then sorbitol comprises at least ⅓ of the total plasticizers contained within the film (by weight). In some embodiments, the plasticizer comprises sorbitol as a first plasticizer and either glycerol or trimethylolpropane as a secondary plasticizer. In alternative embodiments, the plasticizer comprises sorbitol as a first plasticizer and two or more of glycerol, trimethylolpropane, diglycerol, glycerol propylene oxide polymers, glycerol diacetate, and 2-methyl-1,3-propanediol. Optionally, sorbitol can be used in an amount of about 6 PHR to about 15 PHR, or about 6 PHR to about 10 PHR, or about 7 PHR to about 9 PHR, or about 10 PHR to about 14 PHR, or about 12 PHR to about 13 PHR. Optionally glycerol, trimethylolpropane, diglycerol, glycerol propylene oxide polymers, glycerol diacetate, and 2-methyl-1,3-propanediol each can be used in an amount of about 6 PHR to about 15 PHR, or about 6 PHR to about 10 PHR, or about 7 PHR to about 9 PHR, or about 10 PHR to about 14 PHR, or about 12 PHR to about 13 PHR. In embodiments, the water soluble film comprises a PVOH/monomethyl maleate copolymer, the total amount of plasticizer present in the film is in a range of about 24 PHR to about 25 PHR, and the plasticizer blend consists essentially of a 1:1 wt % mixture of glycerol and sorbitol. In embodiments, the water soluble film comprises a PVOH/monomethyl maleate copolymer, the total amount of plasticizer present in the film is in a range of about 24 PHR to about 25 PHR, and the plasticizer blend consists essentially of a 1:1 wt % mixture of trimethylolpropane and sorbitol. In embodiments, the water soluble film comprises a PVOH/monomethyl maleate copolymer, the total amount of plasticizer present in the film is in a range of about 24 PHR to about 25 PHR, and the plasticizer blend consists essentially of a 1:1:1 wt % mixture of trimethylolpropane, glycerol and sorbitol.

When an antioxidant is provided in the water soluble film formulation, the total amount of plasticizer can be on the higher end of the ranges, for example greater than about 17.0 PHR, greater than about 20 PHR, or greater than about 25 PHR, or about 25% to about 400% greater than the amount of plasticizer described above.

Plasticizer levels consistent with those of the examples described herein are specifically contemplated both as representative levels for film formulations with various of the other ingredients described herein, and as various upper and lower bounds for ranges. The specific amounts of plasticizers can be selected in a particular embodiment based on factors described herein, including desired film flexibility and conversion features of the water-soluble film. At low plasticizer levels, films may become brittle, difficult to process, or prone to breaking. At elevated plasticizer levels, films may be too soft, weak, or difficult to process for a desired use.

Surprisingly and advantageously, water soluble films of the disclosure having higher amounts of plasticizer, e.g., greater than about 12 PHR, greater than about 17 PHR, or greater than about 20 PHR, demonstrated stability to harsh oxidizing chemicals. As used herein, a film having "stability to harsh oxidizing chemicals" refers to a film having a thickness of about 2 mil (about 0.05 mm) that dissolves in 600 seconds or less in water at a temperature of 20° C. (68° F.) in accordance with MonoSol Test Method MSTM-205, after storing the film in contact with a harsh chemical oxidizing agent for 6 weeks at 23° C. and 35% relative humidity (RH). Generally, as the amount of plasticizer increases the stability of the film to harsh oxidizing chemicals is expected to decrease because at higher plasticizer levels films are generally less crystalline and more flexible, allowing active species such as protons to migrate through the film and more easily react with a large number of —OH moieties present on the PVOH resin, rendering the film insoluble. Further surprisingly and advantageously, water soluble films of the disclosure having high amounts of plasticizer, e.g., greater than about 20 PHR, and higher amounts of sorbitol, e.g., making up at least ⅓ (by weight) of the total amount of plasticizer were particularly stable in the presence of harsh oxidizing chemicals. Without intending to be bound by theory, it is believed that due to the higher molecular weight of sorbitol (relative to e.g., glycerol and trimethylolpropane), at a given PHR/weight, fewer sorbitol plasticizer molecules are present in the film, providing a more crystalline and less flexible film, and reducing the ability of the oxidizing active species such as protons to migrate through the film.

Antioxidant

In embodiments, the water soluble film can further include an antioxidant, for example, as a chloride scavenger. For example, suitable antioxidants/chloride scavengers include sulfite, bisulfite, thiosulfate, thiosulfate, iodide, nitrite, carbamate, ascorbate, and combinations thereof. In embodiments, the antioxidant is selected from propyl gallate (PGA), citric acid (CA), sodium metabisulfite (SMBS), carbamate, ascorbate, and combinations thereof. In embodiments, the antioxidant is selected from the group consisting of sodium metabisulfite, propyl gallate, citric acid, and combinations thereof. The antioxidant can be included in the film in an amount in a range of about 0.25 to about 1.5 PHR, for example, about 0.25 PHR, about 0.30 PHR, about 0.35 PHR, about 0.40 PHR, about 0.45 PHR, about 0.5 PHR, about 0.75 PHR, about 1.0 PHR, about 1.25 PHR, or about 1.5 PHR.

Auxiliary Film Ingredients

The water soluble film can contain other auxiliary agents and processing agents, such as, but not limited to, surfactants, lubricants, release agents, fillers, extenders, cross-linking agents, antiblocking agents, antioxidants, detackifying agents, antifoams (defoamers), nanoparticles such as layered silicate-type nanoclays (e.g., sodium montmorillonite), bleaching agents (e.g., sodium metabisulfite, sodium bisulfite or others), aversive agents such as bitterants (e.g., denatonium salts such as denatonium benzoate, denatonium saccharide, and denatonium chloride; sucrose octaacetate; quinine; flavonoids such as quercetin and naringen; and quassinoids such as quassin and brucine) and pungents (e.g., capsaicin, piperine, allyl isothiocyanate, and resinferatoxin), and other functional ingredients, in amounts suitable for their intended purposes. In embodiments, the water soluble film may include a filler, a surfactant, an anti-block agent, or combinations of the foregoing.

Surfactants for use in water-soluble films are well known in the art. Optionally, surfactants are included to aid in the dispersion of the resin solution upon casting. Suitable surfactants for water-soluble films of the present disclosure include, but are not limited to, dialkyl sulfosuccinates, lactylated fatty acid esters of glycerol and propylene glycol, lactylic esters of fatty acids, sodium alkyl sulfates, polysorbate 20, polysorbate 60, polysorbate 65, polysorbate 80, alkyl polyethylene glycol ethers, lecithin, acetylated fatty acid esters of glycerol and propylene glycol, sodium lauryl sulfate, acetylated esters of fatty acids, myristyl dimethylamine oxide, trimethyl tallow alkyl ammonium chloride, quaternary ammonium compounds, salts thereof and combinations of any of the forgoing. Too little surfactant can sometimes result in a film having holes, whereas too much surfactant can result in the film having a greasy or oily feel from excess surfactant present on the surface of the film. Thus, surfactants can be included in the water-soluble films in an amount of less than about 2 phr, for example less than about 1 phr, or less than about 0.5 phr, for example.

One type of secondary component contemplated for use is a defoamer. Defoamers can aid in coalescing of foam bubbles. Suitable defoamers for use in water-soluble films according to the present disclosure include, but are not limited to, hydrophobic silicas, for example silicon dioxide or fumed silica in fine particle sizes, including Foam Blast® defoamers available from Emerald Performance Materials, including Foam Blast® 327, Foam Blast® UVD, Foam Blast® 163, Foam Blast® 269, Foam Blast® 338, Foam Blast® 290, Foam Blast® 332, Foam Blast® 349, Foam Blast® 550 and Foam Blast® 339, which are proprietary, non-mineral oil defoamers. In embodiments, defoamers can be used in an amount of 0.5 phr, or less, for example, 0.05 phr, 0.04 phr, 0.03 phr, 0.02 phr, or 0.01 phr.

Suitable fillers/extenders/antiblocking agents/detackifying agents include, but are not limited to, starches, modified starches, crosslinked polyvinylpyrrolidone, crosslinked cellulose, microcrystalline cellulose, silica, metallic oxides, calcium carbonate, talc, mica, stearic acid and metal salts thereof, for example, magnesium stearate. Preferred materials are starches, modified starches and silica. In one type of embodiment, the amount of filler/extender/antiblocking agent/detackifying agent in the water soluble film can be in a range of about 1 wt % to about 6 wt %, or about 1 wt. % to about 4 wt. %, or about 2 wt. % to about 4 wt. %, or about 1 PHR to about 6 PHR, or about 1 PHR to about 4 PHR, or about 2 PHR to about 4 PHR, for example.

Aversive agents may be incorporated within the water soluble film or may be applied as a coating to the water soluble film. The aversive agent may be added in an amount to cause an aversive response such as a bitterness value, diluted from it commercial form or otherwise mixed with a solvent for ease in mixing with other water soluble film components or applying as a coating to the water soluble film. Such solvents may be selected from water, lower molecular weight alcohols (methanol, ethanol, etc.) or plasticizers disclosed herein.

An anti-block agent (e.g. $SiO_2$ and/or stearic acid)) can be present in the film in an amount of at least 0.1 PHR, or at least 0.5 PHR, or at least 1 PHR, or in a range of about 0.1 to 5.0 PHR, or about 0.1 to about 3.0 PHR, or about 0.4 to 1.0 PHR, or about 0.5 to about 0.9 PHR, or about 0.5 to about 2 PHR, or about 0.5 to about 1.5 PHR, or 0.1 to 1.2 PHR, or 0.1 to 2.7 PHR, for example 0.5 PHR, 0.6 PHR, 0.7 PHR, 0.8 PHR, or 0.9 PHR.

A suitable median particle size for the anti-block agent includes a median size in a range of about 3 or about 4 microns to about 11 microns, or about 4 to about 8 microns, or about 5 to about 6 microns, for example 5, 6, 7, 8, or 8 microns. A suitable $SiO_2$ is an untreated synthetic amorphous silica designed for use in aqueous systems.

Chemical Stability Test

The compatibility of water soluble films to chemicals can be determined by evaluating solubility of the film after exposure to chemicals. Water soluble films are cast to a desired thickness (approximately 0.05 mm) and pouches comprising a chemical composition in contact with the pouch film are formed according to any suitable process, e.g., vertical form, fill, and sealing or thermoforming and sealing, as described above.

The pouches containing the chemical composition in contact with the pouch film are stored under ambient conditions (23° C. and 35% RH), at 38° C. and 10% relative humidity (RH), or at 38° C. at 80% RH. The conditions can be chosen to simulate actual storage conditions of unit dose pouches. Samples are stored for 14 days (2 weeks), 28 days (4 weeks), and 42 days (6 weeks).

After the desired storage time has passed, the stability of the film to the chemical composition is determined by measuring the disintegration and dissolution time using MSTM 205, described below. Higher solubility means better compatibility of the film to the chemical composition stored therein.

Dissolution and Disintegration Test (MSTM 205)

A film can be characterized by or tested for Dissolution Time and Disintegration Time according to the MonoSol Test Method 205 (MSTM 205), a method known in the art. See, for example, U.S. Pat. No. 7,022,656.

Apparatus and Materials:
1. 600 mL Beaker
2. Magnetic Stirrer (Labline Model No. 1250 or equivalent)
3. Magnetic Stirring Rod (5 cm)
4. Thermometer (0 to 100° C.±1° C.)
5. Template, Stainless Steel (3.8 cm×3.2 cm)
6. Timer (0-300 seconds, accurate to the nearest second)
7. Polaroid 35 mm slide Mount (or equivalent)
8. MonoSol 35 mm Slide Mount Holder (or equivalent)
9. Distilled water For each film to be tested, three test specimens are cut from a film sample using stainless steel template (i.e., 3.8 cm×3.2 cm specimen). If cut from a film web, specimens should be cut from areas of web evenly spaced along the traverse direction of the web. Each test specimen is then analyzed using the following procedure.

1. Lock each specimen in a separate 35 mm slide mount.
2. Fill beaker with 500 mL of distilled water. Measure water temperature with thermometer and, if necessary, heat or cool water to maintain temperature at 20° C. (about 68° F.).
3. Mark height of column of water. Place magnetic stirrer on base of holder. Place beaker on magnetic stirrer, add magnetic stirring rod to beaker, turn on stirrer, and adjust stir speed until a vortex develops which is approximately one-fifth the height of the water column. Mark depth of vortex.
4. Secure the 35 mm slide mount in the alligator clamp of the 35 mm slide mount holder such that the long end of the slide mount is parallel to the water surface. The depth adjuster of the holder should be set so that when dropped, the end of the clamp will be 0.6 cm below the surface of the water. One of the short sides of the slide mount should be next to the side of the beaker with the other positioned directly over the center of the stirring rod such that the film surface is perpendicular to the flow of the water.

5. In one motion, drop the secured slide and clamp into the water and start the timer. Disintegration occurs when the film breaks apart. When all visible film is released from the slide mount, raise the slide out of the water while continuing to monitor the solution for undissolved film fragments. Dissolution occurs when all film fragments are no longer visible and the solution becomes clear.

The results should include the following: complete sample identification; individual and average disintegration and dissolution times; and water temperature at which the samples were tested.

Film disintegration times (I) and film dissolution times (S) can be corrected to a standard or reference film thickness using the exponential algorithms shown below in Equation 1 and Equation 2, respectively.

$$I_{corrected} = I_{measured} \times (\text{reference thickness/measured thickness})^{2.00} \quad [1]$$

$$S_{corrected} = S_{measured} \times (\text{reference thickness/measured thickness})^{2.00} \quad [2]$$

Tensile Strength Test and Elongation Test (ASTM D 882)

A film characterized by or to be tested for tensile strength according to the Tensile Strength Test and elongation according to the Elongation Test is analyzed as follows. The procedure includes the determination of Tensile Strength and the determination of elongation according to ASTM D 882 ("Standard Test Method for Tensile Properties of Thin Plastic Sheeting") or equivalent. An INSTRON® tensile testing apparatus (Model 5544 Tensile Tester or equivalent) is used for the collection of film data. A minimum of three test specimens, each cut with reliable cutting tools to ensure dimensional stability and reproducibility, are tested in the machine direction (MD) (where applicable) for each measurement. Tests are conducted in the standard laboratory atmosphere of 23±2.0° C. and 35±5% relative humidity. For tensile strength or elongation determination, 1"-wide (2.54 cm) samples of a single film sheet having a thickness of 3.0±0.15 mil (or 76.2±3.8 μm) are prepared. The sample is then transferred to the INSTRON® tensile testing machine to proceed with testing while minimizing exposure in the 35% relative humidity environment. The tensile testing machine is prepared according to manufacturer instructions, equipped with a 500 N load cell, and calibrated. The correct grips and faces are fitted (INSTRON® grips having model number 2702-032 faces, which are rubber coated and 25 mm wide, or equivalent). The samples are mounted into the tensile testing machine and analyzed to determine the elongation (i.e., where Young's Modulus applies) and Tensile Strength (i.e., stress required to break film).

Suitable behavior of films according to the disclosure is marked by Tensile Strength values (in the machine direction (MD)) of at least about 20 MPa as measured by the Tensile Strength Test. In various embodiments, the film has a Tensile Strength value of at least 20 MPa and/or up to about 100 MPa (e.g., about 20, about 40, about 60, about 80 or about 100 MPa).

Suitable behavior of films according to the disclosure is marked by Elongation values (in the machine direction) of at least about 50% as measured by the INSTRON® testing machine. In various embodiments, the film has an Elongation value of at least 50% and/or up to about 700% (e.g., about 50%, about 100%, about 200%, about 225%, about 250%, about 300% about 400%, about 425%, about 450%, about 475%, about 500%, about 600%, or about 700%).

Method of Making Film

As mentioned above, the disclosure relates to the manufacture of films of polyvinyl alcohol, and particularly to solvent cast films. Processes for solvent casting of PVOH are well-known in the art. For example, in the film-forming process, the polyvinyl alcohol resin(s) and secondary additives are dissolved in a solvent, typically water, metered onto a surface, allowed to substantially dry (or force-dried) to form a cast film, and then the resulting cast film is removed from the casting surface. The process can be performed batchwise, and is more efficiently performed in a continuous process.

In the formation of continuous films of polyvinyl alcohol, it is the conventional practice to meter a solution of the solution onto a moving casting surface, for example, a continuously moving metal drum or belt, causing the solvent to be substantially removed from the liquid, whereby a self-supporting cast film is formed, and then stripping the resulting cast film from the casting surface.

Optionally, the water-soluble film can be a free-standing film consisting of one layer or a plurality of like layers.

Packets

The film is useful for creating a packet to contain a composition thereby forming a pouch. The pouch composition may take any form such as powders, gels, pastes, liquids, tablets or any combination thereof. The film is also useful for any other application in which improved wet handling and low cold water residues are desired. The film forms at least one side wall of the pouch, optionally the entire pouch, and preferably an outer surface of the at least one sidewall.

The film described herein can also be used to make a packet with two or more compartments made of the same film or in combination with films of other polymeric materials. Additional films can, for example, be obtained by casting, blow-molding, extrusion or blown extrusion of the same or a different polymeric material, as known in the art. In one type of embodiment, the polymers, copolymers or derivatives thereof suitable for use as the additional film are selected from polyvinyl alcohols, polyvinyl pyrrolidone, polyalkylene oxides, polyacrylic acid, cellulose, cellulose ethers, cellulose esters, cellulose amides, polyvinyl acetates, polycarboxylic acids and salts, polyaminoacids or peptides, polyamides, polyacrylamide, copolymers of maleic/acrylic acids, polysaccharides including starch and gelatin, natural gums such as xanthan, and carrageenans. For example, polymers can be selected from polyacrylates and water-soluble acrylate copolymers, methylcellulose, carboxymethylcellulose sodium, dextrin, ethylcellulose, hydroxyethyl cellulose, hydroxypropyl methylcellulose, maltodextrin, polymethacrylates, and combinations thereof, or selected from polyvinyl alcohols, polyvinyl alcohol copolymers and hydroxypropyl methyl cellulose (HPMC), and combinations thereof. One contemplated class of embodiments is characterized by the level of polymer in the packet material, for example the PVOH copolymer described above, as described above, being at least 60%.

The pouches of the present disclosure can include at least one sealed compartment. Thus, the pouches may comprise a single compartment or multiple compartments. A water-soluble pouch can be formed from two layers of water-soluble polymer film sealed at an interface, or by a single film that is folded upon itself and sealed. One or both of the films include the PVOH film described above. The films define an interior pouch container volume which contains any desired composition for release into an aqueous environment. The composition is not particularly limited, for example including any of the variety of compositions described below. In embodiments comprising multiple compartments, each compartment may contain identical and/or different compositions. In turn, the compositions may take any suitable form including, but not limited to liquid, solid, pressed solids (tablets) and combinations thereof (e.g. a solid suspended in a liquid). In embodiments, the pouches comprises a first, second and third compartment, each of which respectively contains a different first, second, and third composition.

The compartments of multi-compartment pouches may be of the same or different size(s) and/or volume(s). The compartments of the present multi-compartment pouches can be separate or conjoined in any suitable manner. In embodiments, the second and/or third and/or subsequent compartments are superimposed on the first compartment. The compartments may be packed in a string, each compartment being individually separable by a perforation line. Hence each compartment may be individually torn-off from the remainder of the string by the end-user The pouches and/or packets of the present disclosure may comprise one or more different films. For example, in single compartment embodiments, the packet may be made from one wall that is folded onto itself and sealed at the edges, or alternatively, two walls that are sealed together at the edges. In multiple compartment embodiments, the packet may be made from one or more films such that any given packet compartment may comprise walls made from a single film or multiple films having differing compositions.

Pouches and packets may be made using any suitable equipment and method. For example, single compartment pouches may be made using vertical form filling, horizontal form filling, or rotary drum filling techniques commonly known in the art. Such processes may be either continuous or intermittent. The film may be dampened, and/or heated to increase the malleability thereof. The method may also involve the use of a vacuum to draw the film into a suitable mold. The vacuum drawing the film into the mold can be applied for about 0.2 to about 5 seconds, or about 0.3 to about 3, or about 0.5 to about 1.5 seconds, once the film is on the horizontal portion of the surface. This vacuum can be such that it provides an under-pressure in a range of 10 mbar to 1000 mbar, or in a range of 100 mbar to 600 mbar, for example.

The molds, in which packets may be made, can have any shape, length, width and depth, depending on the required dimensions of the pouches. The molds may also vary in size and shape from one to another, if desirable. For example, the volume of the final pouches may be about 5 ml to about 300 ml, or about 10 to 300 ml, or about 20 to about 300 ml, and that the mold sizes are adjusted accordingly. The pouches and/or packets of the disclosure may be of any size suitable for providing a unit dose. The size of the unit dose will depend on the end application. For example, a unit dose pouch for a bulk water application such as a swimming pool may have an internal volume greater than 25 ml such as 250 ml. For example, a unit dose pouch for a bulk water application such as a spa or hot tub may have an internal volume greater than 25 ml, such as 100 ml. In embodiments, the pouch may have an internal volume of at least about 25 ml, or at least about 100 ml, or at least about 150 ml, or at least about 200 ml, or at least about 250 ml, or at least about 300 ml. In embodiments, the pouch contents may be a powder in the form of a loose powder or a pressed tablet. The loose powder or pressed tablet may be provided in an amount of at least about 25 g, or at least about 100 g, or at least about 150 g, or at least about 200 g, or at least about 250 g, or at least about 300 g, or at least about 400 g, or at least about 500 g, or at least about 550 g, or at least about 600 g, for example in a range of about 100 g to about 600 g, or about 250 g to about 550 g, or about 500 g to about 600 g, or about 25 g to about 300 g. The pouches/packets of the disclosure may have a length of at least about 12.5 cm (about 5 inches), at least about 15.25 cm (about 6 inches), at least about 18 cm (about 7 inches), or at least about 23 cm (about 9 inches). In embodiments, the pouches/packets of the disclosure may have a width of at least about 7.5 cm (about 3 inches), at least about 10 cm (about 4 inches), or at least about 12.5 cm (about 5 inches). In embodiments, the pouches/packets may have a length of about 12.5 cm to about 15.25 cm (about 5 to about 6 inches) and a width of about 7.5 cm to about 10 cm (about 3 to about 4 inches).

In one embodiment, the single compartment or plurality of sealed compartments contains a composition. The plurality of compartments may each contain the same or a different composition. The composition is selected from a liquid, solid or combination thereof.

Vertical Form, Fill, and Sealing

In embodiments, the water-soluble film of the disclosure can be formed into a sealed article. In embodiments, the sealed article is a vertical form, filled, and sealed article. The vertical form, fill, and seal (VFFS) process is a conventional automated process. VFFS includes an apparatus such as an assembly machine that wraps a single piece of the film around a vertically oriented feed tube. The machine heat seals or otherwise secures the opposing edges of the film together to create the side seal and form a hollow tube of film. Subsequently, the machine heat seals or otherwise creates the bottom seal, thereby defining a container portion with an open top where the top seal will later be formed. The machine introduces a specified amount of flowable product into the container portion through the open top end. Once the container includes the desired amount of product, the machine advances the film to another heat sealing device, for example, to create the top seal. Finally, the machine advances the film to a cutter that cuts the film immediately above the top seal to provide a filled package.

During operation, the assembly machine advances the film from a roll to form the package. Accordingly, the film must be able to readily advance through the machine and not adhere to the machine assembly or be so brittle as to break during processing. Surprisingly and advantageously, the films of the disclosure having lower amounts of plasticizer, e.g., less than about 20 PHR, less than about 12 PHR, or less than about 10 PHR, demonstrated good conversion into pouches by VFFS. As described above, films having low amounts of plasticizer are generally expected to be brittle and would not readily convert into pouches by VFFS. Accordingly, films of the disclosure can be prepared that have one or more advantages including good stability to harsh oxidizing chemicals and good conversion into pouches/packets by VFF.

Water soluble films may be converted by VFFS on a Rovema VFFS machine or equivalent. Pouches/packets are prepared in the standard laboratory atmosphere of 78° F. (about 25.5° C.) and 24% relative humidity. Both unfilled bags and bags filled with salt are produced. The salt-containing bags are filled to 1.2 lbs (about 550 g) at max fill level. The horizontal seal temperature is 225° F. (about 107° C.), and the vertical seal temperature is varied as needed to produce a good seal, for example, between about 255° F. (about 124° C.) and 280° F. (about 138° C.).

Shaping, Sealing, and Thermoforming

A thermoformable film is one that can be shaped through the application of heat and a force. Water soluble films with relatively higher levels of plasticizer(s) are believed to be suitable for such a process.

Thermoforming a film is the process of heating the film, shaping it (e.g. in a mold), and then allowing the film to cool, whereupon the film will hold its shape, e.g. the shape of the mold. The heat may be applied using any suitable means. For example, the film may be heated directly by passing it under a heating element or through hot air, prior to feeding it onto a surface or once on a surface. Alternatively, it may be heated indirectly, for example by heating the surface or applying a hot item onto the film. In embodiments, the film is heated using an infrared light. The film may be heated to a temperature in a range of about 50 to about 150° C., about 50 to about 120° C., about 60 to about 130° C., about 70 to about 120° C., or about 60 to about 90° C. Thermoforming can be performed by any one or more of the following processes: the manual draping of a thermally softened film over a mold, or the pressure induced shaping of a softened film to a mold (e.g., vacuum forming), or the automatic high-speed indexing of a freshly extruded sheet having an accurately known temperature into a forming and trimming station, or the automatic placement, plug and/or pneumatic stretching and pressuring forming of a film.

Alternatively, the film can be wetted by any suitable means, for example directly by spraying a wetting agent (including water, a solution of the film composition, a plasticizer for the film composition, or any combination of the foregoing) onto the film, prior to feeding it onto the surface or once on the surface, or indirectly by wetting the surface or by applying a wet item onto the film.

Once a film has been heated and/or wetted, it may be drawn into an appropriate mold, preferably using a vacuum. The filling of the molded film can be accomplished by utilizing any suitable means. In embodiments, the most preferred method will depend on the product form and required speed of filling. In embodiments, the molded film is filled by in-line filling techniques. The filled, open packets are then closed forming the pouches, using a second film, by any suitable method. This may be accomplished while in horizontal position and in continuous, constant motion. The closing may be accomplished by continuously feeding a second film, preferably water-soluble film, over and onto the open packets and then preferably sealing the first and second film together, typically in the area between the molds and thus between the packets.

Any suitable method of sealing the packet and/or the individual compartments thereof may be utilized. Non-limiting examples of such means include heat sealing, solvent welding, solvent or wet sealing, and combinations thereof. Typically, only the area which is to form the seal is treated with heat or solvent. The heat or solvent can be applied by any method, typically on the closing material, and typically only on the areas which are to form the seal. If solvent or wet sealing or welding is used, it may be preferred that heat is also applied. Preferred wet or solvent sealing/welding methods include selectively applying solvent onto the area between the molds, or on the closing material, by for example, spraying or printing this onto these areas, and then applying pressure onto these areas, to form the seal. Sealing rolls and belts as described above (optionally also providing heat) can be used, for example.

The formed pouches may then be cut by a cutting device. Cutting can be accomplished using any known method. It may be preferred that the cutting is also done in continuous manner, and preferably with constant speed and preferably while in horizontal position. The cutting device can, for example, be a sharp item, or a hot item, or a laser, whereby in the latter cases, the hot item or laser 'burns' through the film/sealing area.

The different compartments of a multi-compartment pouches may be made together in a side-by-side style wherein the resulting, cojoined pouches may or may not be separated by cutting. Alternatively, the compartments can be made separately.

In embodiments, pouches may be made according to a process comprising the steps of: a) forming a first compartment (as described above); b) forming a recess within or all of the closed compartment formed in step (a), to generate a second molded compartment superposed above the first compartment; c) filling and closing the second compartments by means of a third film; d) sealing the first, second and third films; and e) cutting the films to produce a multi-compartment pouch. The recess formed in step (b) may be achieved by applying a vacuum to the compartment prepared in step (a).

In embodiments, second, and/or third compartment(s) can be made in a separate step and then combined with the first compartment as described in European Patent Application Number 08101442.5 or U.S. Patent Application Publication No. 2013/240388 A1 or WO 2009/152031.

In embodiments, pouches may be made according to a process comprising the steps of: a) forming a first compartment, optionally using heat and/or vacuum, using a first film on a first forming machine; b) filling the first compartment with a first composition; c) on a second forming machine, deforming a second film, optionally using heat and vacuum, to make a second and optionally third molded compartment; d) filling the second and optionally third compartments; e) sealing the second and optionally third compartment using a third film; f) placing the sealed second and optionally third compartments onto the first compartment; g) sealing the first, second and optionally third compartments; and h) cutting the films to produce a multi-compartment pouch.

The first and second forming machines may be selected based on their suitability to perform the above process. In embodiments, the first forming machine is preferably a horizontal forming machine, and the second forming machine is preferably a rotary drum forming machine, preferably located above the first forming machine.

It should be understood that by the use of appropriate feed stations, it may be possible to manufacture multi-compartment pouches incorporating a number of different or distinctive compositions and/or different or distinctive liquid, gel or paste compositions.

In embodiments, the film and/or pouch is sprayed or dusted with a suitable material, such as an active agent, a lubricant, an aversive agent, or mixtures thereof. In embodiments, the film and/or pouch is printed upon, for example, with an ink and/or an active agent.

Pouch Contents

The present articles (e.g., in the form of pouches or packets) may contain various compositions, for example water-treatment compositions. A multi-compartment pouch may contain the same or different compositions in each separate compartment. The composition is proximal to the water-soluble film. The composition may be less than about 10 cm, or less than about 5 cm, or less than about 1 cm from the film. Typically the composition is adjacent to the film or in contact with the film. The film may be in the form of a pouch or a compartment, containing the composition therein.

In embodiments, the water soluble film is formed into a sealed pouch, for example by VFFS, and encloses an oxidizing composition. In embodiments the oxidizing composition is a chlorinated or brominated composition. In embodiments, the oxidizing composition is a water-treatment agent. Such agents include aggressive oxidizing chemicals, e.g. as described in U.S. Patent Application Publication No. 2014/0110301 and U.S. Pat. No. 8,728,593. For example, sanitizing agents can include hypochlorite salts such as sodium hypochlorite, calcium hypochlorite, and lithium hypochlorite; chlorinated isocyanurates such as dichloroisocyanuric acid (also referred to as "dichlor" or dichloro-s-triazinetrione, 1,3-dichloro-1,3,5-triazinane-2,4,6-trione) and trichloroisocyanuric acid (also referred to as "trichlor" or 1,3,5-trichloro-1,3,5-triazinane-2,4,6-trione) or trichloroisocyanurate (TC); chlorates and perchlorates. Salts and hydrates of the sanitizing compounds are also contemplated. For example, dichloroisocyanuric acid may be provided as sodium dichloroisocyanurate, sodium dichloroisocyanurate acid dihydrate, among others. Bromine containing sanitizing agents may also be suitable for use in unit dose packaging applications, such as brominated isocyanurates, bromates, perbromates, 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin (BCDMH); and 2-bromo-2-nitro-1,3-propanediol, among others. Other suitable oxidizing agents include, but are not limited to, perborates, periodates, persulfates, permanganates, chromates, dichromates, nitrates, nitrites, peroxides, ketone peroxides, peroxy acids inorganic acids, and combinations thereof. In embodiments, the oxidizing agent comprises an oxidizing agent selected from the group consisting of sodium hypochlorite, calcium hypochlorite, and lithium hypochlorite, dichloroisocyanuric acid, trichloroisocyanuric acid, trichloroisocyanurate (TC), salts and hydrates of the foregoing, 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin (BCDMH), 2-bromo-2-nitro-1,3-propanediol, and combinations thereof. In embodiments, the oxidizing agent comprises an oxidizing agent selected from the group consisting of trichloroisocyanurate, 1-bromo-3-chloro-5,5-dimethylhydantoin, and combinations thereof.

Specifically contemplated embodiments of the disclosure are herein described in the following numbered paragraphs. These embodiments are intended to be illustrative in nature and not intended to be limiting.

1. A water-soluble film comprising a mixture of a water-soluble polyvinyl alcohol copolymer, the copolymer including an anionic monomer having a pendant carboxyl group, and a plasticizer blend comprising a first plasticizer comprising sorbitol and a secondary plasticizer selected from the group consisting of glycerol, trimethylolpropane, diglycerol, glycerol propylene oxide polymers, glycerol diacetate, 2-methyl-1,3-propanediol and a combination thereof, wherein
  (i) when the total amount of plasticizer included in the film is less than 12 PHR, then the plasticizer blend comprises sorbitol, glycerol, and at least one additional secondary plasticizer;
  (ii) when the total amount of plasticizer included in the film is at least 12 PHR and less than 20 PHR, then the plasticizer blend comprises sorbitol, glycerol, and at least one additional secondary plasticizer selected from diglycerol, trimethylolpropane and a combination thereof; and
  (iii) when the total amount of plasticizer included in the film is 20 PHR or greater, then the sorbitol comprises at least ⅓ of the total amount of plasticizer (by weight).

2. The water-soluble film of paragraph 1, wherein when glycerol is included in the film it is included in an amount of at least 2.0 wt. %, based on the total weight of the film.

3. The water-soluble film of paragraph 1 or paragraph 2, wherein the total amount of plasticizer in the film is at least 2 PHR, at least 5 PHR, or at least 6.5 PHR, based on the total resin in the film.

4. The water soluble film of any one of paragraphs 1 to 3, wherein the total amount of plasticizer is less than about 12 PHR, less than about 10 PHR, less than about 8 PHR, or less than about 7.5 PHR, based on total resin in the film.

5. The water-soluble film of paragraph 1 or paragraph 2, wherein the total amount of plasticizer in the film is in a range of about 15 to about 20 PHR, or about 16 to 18 PHR, based on the total resin in the film.

6. The water soluble film of paragraph 1 or paragraph 2, wherein the total amount of plasticizer in the film is in a range of about 21 PHR to about 27 PHR, or about 23 to 25 PHR, based on the total resin in the film.

7. The water-soluble film of any one of the preceding paragraphs, wherein the anionic monomer unit is selected from the group consisting of vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, alkali metal salts of the foregoing, esters of the foregoing, and combinations of the foregoing.

8. The water soluble film of paragraph 7, wherein the anionic monomer unit comprises one or more of maleic acid, monoalkyl maleate, dialkyl maleate, monomethyl maleate, dimethyl maleate, maleic anhydride, alkali metal salts of the foregoing, esters of the forgoing, and combinations thereof.

9. The water-soluble film of paragraph 8, wherein the anionic monomer unit is selected from the group consisting of maleic acid, monomethyl maleate, dimethyl maleate, maleic anhydride, alkali metal salts of the foregoing, esters of the foregoing, and combinations thereof.

10. The water-soluble film of any one of the preceding paragraphs, wherein the PVOH copolymer comprises a degree of hydrolysis in a range of 87 to 98, or 89 to 97, or 90 to 96.

11. The water-soluble film of paragraph 10, wherein the PVOH copolymer has a degree of hydrolysis in a range of 94 to 98.

12. The water-soluble film of paragraph 11, wherein the PVOH copolymer has a degree of hydrolysis of 96.

13. The water soluble film of any one of the preceding paragraphs, further comprising an antioxidant.

14. The water soluble film of paragraph 13, wherein the antioxidant is selected from the group consisting of sodium metabisulfite, propyl gallate, citric acid, and combinations thereof.

15. The water-soluble film of any one of the preceding paragraph, wherein a film having the identical composition and a thickness of about 2 mil (about 0.05 mm), dissolves in 600 seconds or less in water at a temperature of 20° C. (68°

F.) in accordance with MonoSol Test Method MSTM-205 after storing in contact with a harsh chemical oxidizing agent for 6 weeks at 23° C. and 35% relative humidity (RH).

16. The water soluble film of any one of the preceding paragraphs, further comprising a filler, a surfactant, an anti-block agent or combinations of the foregoing.

17. The water soluble film of paragraph 1, wherein the anionic monomer comprises monomethyl maleate, the total plasticizer present in the film is in a range of 7 to 8 PHR, and the plasticizer blend consists essentially of glycerol, sorbitol, and diglycerol.

18. The water soluble film of paragraph 1, wherein the anionic monomer comprises monomethyl maleate, the total plasticizer present in the film is in a range of 7 to 8 PHR, and the plasticizer blend consists essentially of glycerol, sorbitol, and trimethylolpropane.

19. The water soluble film of paragraph 1, wherein the anionic monomer comprises monomethyl maleate, the total plasticizer present in the film is in a range of 24 to 25 PHR, and the plasticizer blend consists essentially of a 1:1 wt % mixture of glycerol and sorbitol.

20. The water soluble film of paragraph 1, wherein the anionic monomer comprises monomethyl maleate, the total plasticizer present in the film is in a range of 24 to 25 PHR, and the plasticizer blend consists essentially of a 1:1 wt % mixture of trimethylolpropane and sorbitol.

21. The water soluble film of paragraph 1, wherein the anionic monomer comprises monomethyl maleate, the total plasticizer present in the film is in a range of 24 to 25 PHR, and the plasticizer blend consists essentially of a 1:1:1 wt % mixture trimethylolpropane, glycerol and sorbitol.

22. The water soluble film of paragraph 1, wherein the anionic monomer comprises monomethyl maleate, the total plasticizer present in the film is in a range of 16.5 to 17.5 PHR, and the plasticizer blend consists essentially of glycerol, sorbitol, and diglycerol.

23. The water soluble film of paragraph 1, wherein the anionic monomer comprises monomethyl maleate, the total plasticizer present in the film is in a range of 16.5 to 17.5 PHR, and the plasticizer blend consists essentially of glycerol, sorbitol, and trimethylolpropane.

24. A sealed article comprising the water-soluble film of any one of the preceding paragraphs.

25. The sealed article of paragraph 24, wherein the article is a vertical form, filled, and sealed article.

26. A sealed pouch comprising the film of any one of the preceding paragraphs that encloses an oxidizing composition.

27. The sealed pouch of paragraph 26, wherein the pouch is a vertical form, filled, and sealed pouch.

28. The sealed pouch of paragraph 26 or paragraph 27, wherein the oxidizing composition is a chlorinated or brominated composition.

29. The sealed pouch of any one of paragraphs 26 to 28, wherein the oxidizing agent comprises an oxidizing agent selected from the group consisting of sodium hypochlorite, calcium hypochlorite, and lithium hypochlorite, dichloroisocyanuric acid, trichloroisocyanuric acid, trichloroisocyanurate (TC), salts and hydrates of the foregoing, 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin (BCDMH), 2-bromo-2-nitro-1,3-propanediol, and combinations thereof.

30. The sealed pouch of any one of paragraphs 26 to 29, wherein the oxidizing agent comprises an oxidizing agent selected from the group consisting of trichloroisocyanurate, 1-bromo-3-chloro-5,5-dimethylhydantoin, and combinations thereof.

31. The sealed pouch of any one of paragraphs 27 to 30, wherein the pouch has an interior volume of at least about 25 ml, or at least about 100 ml, or at least about 150 ml, or at least about 200 ml, or at least about 250 ml, or at least about 300 ml.

32. The sealed pouch of any one of paragraph s 27 to 31, wherein the pouch has a length of at least about 12.5 cm (about 5 inches), at least about 18 cm (about 7 inches), or at least about 23 cm (about 9 inches).

The water soluble films in accordance with the disclosure can be better understood in light of the following examples, which are merely intended to illustrate the water soluble films and are not meant to limit the scope thereof in any way.

EXAMPLES

Example 1: Film Compatibility with Trichloroisocyanurate (TC)

Trichloroisocyanurate is one of the strongest chloro-containing oxidizing agents used in pool and spa water treatment. Water soluble films comprising PVOH/monomethyl maleate or PVOH/2-acrylamide-2-methylpropanesulfonic acid (AMPS) copolymers were prepared having the plasticizers described below in Table 1 and Table 2. The films had a thickness of 1.5 mil (about 38 μm). Pouches were prepared by encapsulating within the film about 16 mg of trichloroisocyanurate. Solubility of the water soluble film of the water soluble pouches was tested at t=0 (no storage), 2 weeks, 4 weeks and 6 weeks. The pouches were stored at 23° C. and 35% RH. The dissolution time for each pouch was determined at 21° C., according to MSTM 205. Films that dissolved in under 600 seconds after 6 weeks of storage are indicated as (+) in Table 1 and Table 2. Films that did not dissolve in under 600 seconds after 6 weeks of storage are labeled as (−) in Table 1 and Table 2.

TABLE 1

| Film Sample # | Total plasticizer level (PHR) | Resin | Glycerol | Sorbitol | MP-Diol | TMP | Voranol™ 230-660 | Diacetin | Diglycerol | Solubility |
|---|---|---|---|---|---|---|---|---|---|---|
| 1 | 24.35 | MMM-1[1] | 6.7 | 4.4 | 13.3 | | | | | − |
| 2 | 24.35 | MMM-1 | 6.7 | 4.4 | | 13.3 | | | | − |
| 3 | 24.35 | MMM-1 | 6.7 | 4.4 | | | 13.3 | | | − |
| 4 | 24.35 | MMM-1 | 6.7 | 4.4 | | | | 13.3 | | − |
| 5 | 24.35 | MMM-1 | 6.7 | 4.4 | | | | | 13.3 | − |

TABLE 1-continued

| Film Sample # | Total plasticizer level (PHR) | Resin | Glycerol | Sorbitol | MP-Diol | TMP | Voranol™ 230-660 | Diacetin | Diglycerol | Solubility |
|---|---|---|---|---|---|---|---|---|---|---|
| 6 | 17.05 | MMM-1 | 4.7 | 3.0 | 9.3 | | | | | − |
| 7 | 17.05 | MMM-1 | 4.7 | 3.0 | | 9.3 | | | | + |
| 8 | 17.05 | MMM-1 | 4.7 | 3.0 | | | 9.3 | | | − |
| 9 | 17.05 | MMM-1 | 4.7 | 3.0 | | | | 9.3 | | − |
| 10 | 17.05 | MMM-1 | 4.7 | 3.0 | | | | | 9.3 | + |
| 11 | 7.31 | MMM-1 | 2.0 | 1.3 | 4.0 | | | | | + |
| 12 | 7.31 | MMM-1 | 2.0 | 1.3 | | 4.0 | | | | + |
| 13 | 7.31 | MMM-1 | 2.0 | 1.3 | | | 4.0 | | | + |
| 14 | 7.31 | MMM-1 | 2.0 | 1.3 | | | | 4.0 | | + |
| 15 | 7.31 | MMM-1 | 2.0 | 1.3 | | | | | 4.0 | + |
| 16 | 24.35 | AMPS | 6.7 | 4.4 | 13.3 | | | | | − |
| 17 | 24.35 | AMPS | 6.7 | 4.4 | | 13.3 | | | | − |
| 18 | 24.35 | AMPS | 6.7 | 4.4 | | | 13.3 | | | − |
| 19 | 24.35 | AMPS | 6.7 | 4.4 | | | | 13.3 | | − |
| 20 | 7.31 | AMPS | 2.0 | 1.3 | 4.0 | | | | | − |
| 21 | 7.31 | AMPS | 2.0 | 1.3 | | 4.0 | | | | + |
| 22 | 7.31 | AMPS | 2.0 | 1.3 | | | 4.0 | | | − |
| 23 | 7.31 | AMPS | 2.0 | 1.3 | | | | 4.0 | | + |
| 24 | 24.35 | MMM-2[3] | 6.7 | 4.4 | 13.3 | | | | | − |
| 25 | 24.35 | MMM-2 | 6.7 | 4.4 | | 13.3 | | | | − |
| 26 | 24.35 | MMM-2 | 6.7 | 4.4 | | | 13.3 | | | − |
| 27 | 24.35 | MMM-2 | 6.7 | 4.4 | | | | 13.3 | | − |
| 28 | 7.31 | MMM-2 | 2.0 | 1.3 | 4.0 | | | | | + |
| 29 | 7.31 | MMM-2 | 2.0 | 1.3 | | 4.0 | | | | + |
| 30 | 7.31 | MMM-2 | 2.0 | 1.3 | | | 4.0 | | | + |
| 31 | 7.31 | MMM-2 | 2.0 | 1.3 | | | | 4.0 | | + |

[1] MMM-1 is a PVOH/monomethyl maleate copolymer having 4.0 mol% maleate modification and a degree of hydrolysis of 96 mol%.
[2] AMPS is a PVOH/2-acrylamido-2-methylpropane sulfonic acid copolymer having 4.0 mol% AMPS modification.
[3] MMM-2 is a PV0H/monomethyl maleate copolymer having 4.0 mol% maleate modification and a degree of hydrolysis of 90 mol%.

Table 1 shows that films of the disclosure comprising PVOH copolymers comprising an anionic monomer having a pendant carboxyl group and having a first plasticizer comprising sorbitol and a second plasticizer comprising glycerol and at least one of trimethylolpropane or diglycerol, are compatible with trichloroisocyanurate, when the total amount of plasticizer is in the range of 12 PHR to 20 PHR. Further, films of the disclosure comprising PVOH copolymers including an anionic monomer having a pendant carboxyl group and having a first plasticizer comprising sorbitol and a second plasticizer comprising glycerol and at least one of 2-methyl-1,3-propanediol, trimethylolpropane, glycerol propylene oxide polymers (e.g., Voranol™ 230-660), glycerol diacetate, and diglycerol are compatible with trichloroisocyanurate when the total amount of plasticizer is less than 12 phr. In contrast, films comprising PVOH copolymer comprising an anionic monomer that does not include a pendant carboxyl group, but the film includes a total amount of plasticizer less than 12 phr, a first plasticizer comprising sorbitol and a second plasticizer comprising glycerol and at least one additional plasticizer selected from 2-methyl-1,3, propanediol, trimethylolpropane, glycerol propylene oxide polymers (e.g., Voranol™ 230-660), glycerol diacetate, and diglycerol are only compatible with trichloroisocyanurate when the additional plasticizer is trimethylolpropane or glycerol diacetate.

TABLE 2

| Film Sample # | Plasticizer level (PHR) | Resin | Glycerol | Sorbitol | Diglycerol | TMP | 0 | 2 weeks | 4 weeks | 6 weeks | Solubility |
|---|---|---|---|---|---|---|---|---|---|---|---|
| 2 | 24.35 | MMM-1 | 6.66 | 4.37 | | 13.32 | 9 | 10 | 600 | 600 | − |
| 5 | 24.35 | MMM-1 | 6.66 | 4.37 | 13.32 | | 16 | 15 | 95 | 423 | − |
| 7 | 17.05 | MMM-1 | 4.7 | 3.0 | | 9.3 | 10 | 9 | 13 | 26 | + |
| 10 | 17.05 | MMM-1 | 4.7 | 3.0 | 9.3 | | 15 | 14 | 20 | 28 | + |
| 12 | 7.31 | MMM-1 | | | | | 10 | 9 | 11 | 11 | + |
| 15 | 7.31 | MMM-1 | | | | | 19 | 15 | 18 | 23 | + |
| 32 | 24.35 | MMM-1 | 12.18 | 12.18 | | | 14 | 18 | 18 | 20 | + |
| 33 | 24.35 | MMM-1 | 12.18 | | | 12.18 | 13 | 13 | 27 | 580 | − |
| 34 | 24.35 | MMM-1 | | 12.18 | | 12.18 | 15 | 16 | 17 | 15 | + |
| 35 | 24.35 | MMM-1 | 8.12 | 8.12 | | 8.12 | 14 | 16 | 29 | 27 | + |

Table 2 shows that films comprising PVOH copolymers having an anionic monomer having a pendant carboxyl group, the film further including a first plasticizer comprising sorbitol and a second plasticizer comprising glycerol and at least one of diglycerol or trimethylolpropane are compatible with trichloroisocyanurate when the total amount of plasticizer is less than 20 PHR, for example in a range of about 12 PHR to about 20 PHR (e.g., Samples 7, 10, 12, and 15). Table 2 further shows that films comprising PVOH copolymers having an anionic monomer having a pendant carboxyl group, the film further including a first plasticizer comprising sorbitol and a total plasticizer amount of greater than 20 PHR are compatible with trichloroisocyanurate when the sorbitol comprises at least ⅓ of the total amount of plasticizer (e.g., Samples 32-35).

Example 2: Film Compatibility with Trichloroisocyanurate (TC) in the Presence of an Antioxidant Water soluble films comprising PVOH/monomethyl maleate copolymers were prepared and converted into pouches containing trichloroisocyanurate as described in Example 1 having the plasticizers shown in Table 3. Film samples 36-41 further included an antioxidant in the amounts listed in Table 3, below, and were compared to film samples 2, 7, and 12 prepared in Example 1, without any antioxidant. Solubility data for the water soluble film of the water soluble pouches was obtained as described in Example 1.

group, the film further including a first plasticizer comprising sorbitol and a second plasticizer comprising glycerol and trimethylolpropane having a total amount of plasticizer greater than 20 PHR and an amount of sorbitol of less than ⅓ the total amount of plasticizer (e.g., film sample 2) can be made compatible with trichloroisocyanurate when an antioxidant is included in the film in an amount in a range of about 0.25 to about 1.5 PHR (e.g., film samples 36 and 37).

Example 3: Film Compatibility with 1-bromo-3-chloro-5,5-dimethylhydantoin (BCDMH)

1-bromo-3-chloro-5,5-dimethylhydantoin is also considered a harsher oxidizing agent. BCDMH is an excellent source of both chlorine and bromine as it reacts slowly with water releasing hypochlorous acid and hypobromous acid. Water soluble films comprising PVOH/monomethyl maleate or PVOH/2-acrylamide-2-methylpropanesulfonic acid (AMPS) copolymers were prepared having the plasticizers described below in Table 4 and Table 5. The films had a thickness of 2 mil (about 50 μm). Pouches were prepared by encapsulating within the film 16 mg of 1-bromo-3-chloro-5,5-dimethylhydantoin. Solubility of the water soluble film of the water soluble pouches was tested at t=0 (no storage), 2 weeks, 4 weeks and 6 weeks. The pouches were stored at 23° C. and 35% RH. The dissolution time for each pouch was determined at 21° C., according to MS™ 205. Films that dissolved in under 600 seconds after 6 weeks of storage are indicated as (+) in Table 4 and Table 5. Films that did not

TABLE 3

| Film Sample # | Plasticizer level (PHR) | Resin | Glycerol | Sorbitol | TMP | PGA[4] | CA[5] | SMBS[6] | Solubility |
|---|---|---|---|---|---|---|---|---|---|
| 2 | 24.35 | MMM-1 | 6.66 | 4.37 | 13.3 | | | | − |
| 36 | 24.35 | MMM-1 | 6.7 | 4.4 | 13.3 | 1.0 | 0.5 | | + |
| 37 | 24.35 | MMM-1 | 6.7 | 4.4 | 13.3 | | | +0.27 | + |
| 7 | 17.05 | MMM-1 | 4.7 | 3.0 | 9.3 | | | | + |
| 38 | 17.05 | MMM-1 | 4.7 | 3.0 | 9.3 | 1.0 | 0.5 | | + |
| 39 | 17.05 | MMM-1 | 4.7 | 3.0 | 9.3 | | | +0.27 | + |
| 12 | 7.31 | MMM-1 | 2.0 | 1.3 | 4.0 | | | | + |
| 40 | 7.31 | MMM-1 | 2.0 | 1.3 | 4.0 | 1.0 | 0.5 | | + |
| 41 | 7.31 | MMM-1 | 2.0 | 1.3 | 4.0 | | | +0.27 | + |

[4]PGA is propyl gallate
[5]CA is citric acid.
[6]SMBS is sodium metabisulfite.

Table 3 shows that films comprising PVOH copolymers having an anionic monomer including a pendant carboxyl dissolve in under 600 seconds after 6 weeks of storage are labeled as (−) in Table 4 and Table 5.

TABLE 4

| Film Sample # | Plasticizer level (PHR) | Resin | Glycerol | Sorbitol | MP-Diol | TMP | Voranol™ 230-660 | Diacetin | Solubility |
|---|---|---|---|---|---|---|---|---|---|
| 42 | 24.35 | MMM-1 | 6.7 | 4.4 | 13.3 | | | | − |
| 43 | 24.35 | MMM-1 | 6.7 | 4.4 | | 13.3 | | | + |
| 44 | 24.35 | MMM-1 | 6.7 | 4.4 | | | 13.3 | | − |
| 45 | 24.35 | MMM-1 | 6.7 | 4.4 | | | | 13.3 | − |
| 46 | 17.05 | MMM-1 | 4.7 | 3.0 | 9.3 | | | | − |
| 47 | 17.05 | MMM-1 | 4.7 | 3.0 | | 9.3 | | | + |
| 48 | 17.05 | MMM-1 | 4.7 | 3.0 | | | 9.3 | | + |
| 49 | 17.05 | MMM-1 | 4.7 | 3.0 | | | | 9.3 | + |
| 50 | 7.31 | MMM-1 | 2.0 | 1.3 | 4.0 | | | | + |
| 51 | 7.31 | MMM-1 | 2.0 | 1.3 | | 4.0 | | | + |
| 52 | 7.31 | MMM-1 | 2.0 | 1.3 | | | 4.0 | | + |
| 53 | 7.31 | MMM-1 | 2.0 | 1.3 | | | | 4.0 | + |
| 54 | 24.35 | AMPS | 6.7 | 4.4 | 13.3 | | | | − |

TABLE 4-continued

| Film Sample # | Plasticizer level (PHR) | Resin | Glycerol | Sorbitol | MP-Diol | TMP | Voranol™ 230-660 | Diacetin | Solubility |
|---|---|---|---|---|---|---|---|---|---|
| 55 | 24.35 | AMPS | 6.7 | 4.4 | | 13.3 | | | − |
| 56 | 24.35 | AMPS | 6.7 | 4.4 | | | 13.3 | | − |
| 57 | 24.35 | AMPS | 6.7 | 4.4 | | | | 13.3 | − |
| 58 | 7.31 | AMPS | 2.0 | 1.3 | 4.0 | | | | + |
| 59 | 7.31 | AMPS | 2.0 | 1.3 | | 4.0 | | | + |
| 60 | 7.31 | AMPS | 2.0 | 1.3 | | | 4.0 | | + |
| 61 | 7.31 | AMPS | 2.0 | 1.3 | | | | 4.0 | + |
| 62 | 24.35 | MMM-2 | 6.7 | 4.4 | 13.3 | | | | − |
| 63 | 24.35 | MMM-2 | 6.7 | 4.4 | | 13.3 | | | − |
| 64 | 24.35 | MMM-2 | 6.7 | 4.4 | | | 13.3 | | − |
| 65 | 24.35 | MMM-2 | 6.7 | 4.4 | | | | 13.3 | − |
| 66 | 7.31 | MMM-2 | 2.0 | 1.3 | 4.0 | | | | + |
| 67 | 7.31 | MMM-2 | 2.0 | 1.3 | | 4.0 | | | + |
| 68 | 7.31 | MMM-2 | 2.0 | 1.3 | | | 4.0 | | + |
| 69 | 7.31 | MMM-2 | 2.0 | 1.3 | | | | 4.0 | + |

Table 4 shows that films comprising PVOH copolymers having anionic monomers and having a first plasticizer comprising sorbitol and a second plasticizer comprising glycerol and trimethylolpropane are compatible with 1-bromo-3-chloro-5,5-dimethylhydantoin, when the total amount of plasticizer is less than 20 PHR.

Table 4 shows that films of the disclosure comprising PVOH copolymers comprising an anionic monomer having a pendant carboxyl group and having a first plasticizer comprising sorbitol and a second plasticizer comprising glycerol and at least one of trimethylolpropane, glycerol propylene oxide polymers (e.g., Voranol™ 230-660), or glycerol diacetate, are compatible with 1-bromo-3-chloro-5,5-dimethylhydantoin, when the total amount of plasticizer is in the range of 12 PHR to 20 PHR. Further, films of the disclosure comprising PVOH copolymers including an anionic monomer having a pendant carboxyl group and having a first plasticizer comprising sorbitol and a second plasticizer comprising glycerol and at least one of 2-methyl-1,3-propanediol, trimethylolpropane, glycerol propylene oxide polymers (e.g., Voranol™ 230-660), and glycerol diacetate are compatible with 1-bromo-3-chloro-5,5-dimethylhydantoin when the total amount of plasticizer is less than 12 phr.

TABLE 5

| Film Sample # | Plasticizer level (PHR) | Resin | Glycerol | Sorbitol | Diglycerol | TMP | 0 | 2 weeks | 4 weeks | 6 weeks | Solubility |
|---|---|---|---|---|---|---|---|---|---|---|---|
| 43 | 24.35 | MMM-1 | 6.66 | 4.37 | | 13.32 | 9 | 10 | 12 | 21 | + |
| 70 | 24.35 | MMM-1 | 6.66 | 4.37 | 13.32 | | 16 | 15 | 19 | 15 | + |
| 47 | 17.0 | MMM-1 | 4.7 | 3.0 | | 9.3 | 10 | 12 | 11 | 12 | + |
| 71 | 17.0 | MMM-1 | 4.7 | 3.0 | 9.3 | | 15 | 14 | 17 | 19 | + |
| 51 | 7.3 | MMM-1 | 2.0 | 1.3 | | 4.0 | 10 | 11 | 10 | 12 | + |
| 72 | 7.3 | MMM-1 | 2.0 | 1.3 | 4.0 | | 19 | 15 | 19 | 21 | + |
| 73 | 24.35 | MMM-1 | 12.18 | 12.18 | | | 14 | 18 | 16 | 16 | + |
| 74 | 24.35 | MMM-1 | 12.18 | | | 12.18 | 13 | 13 | 15 | 18 | + |
| 75 | 24.35 | MMM-1 | | 12.18 | | 12.18 | 15 | 16 | 15 | 15 | + |
| 76 | 24.35 | MMM-1 | 8.12 | 8.12 | | 8.12 | 14 | 16 | 17 | 16 | + |

Table 5 shows that films comprising PVOH copolymers comprising an anionic monomer unit having a pendant carboxyl group, the film further including a first plasticizer comprising sorbitol and a second plasticizer comprising glycerol and one of diglycerol or trimethylolpropane are compatible with 1-bromo-3-chloro-5,5-dimethylhydantoin (e.g., Samples 43, 47, and 51).

Example 4: Vertical Form, Fill, and Sealing

Water soluble films comprising PVOH/monomethyl maleate copolymers were prepared having the plasticizers described below in Table 6. The films had a thickness of 2 mil (about 50 μm). The convertibility of the films were determined by VFFS as described above. Films that successfully formed into sealed packages of approximately 5 inches by 9 inches and containing about 1.2 lbs of salt (about 550 grams) are indicated with a (+) in Table 6.

TABLE 6

| Film Sample # | Plasticizer level (PHR) | Resin | Glycerol | Sorbitol | Diglycerol | TMP | VFFS |
|---|---|---|---|---|---|---|---|
| 35 | 24.36 | MMM-1 | 8.12 | 8.12 | | 8.12 | + |
| 34 | 24.36 | MMM-1 | | 12.18 | | 12.18 | + |
| 32 | 24.36 | MMM-1 | 12.18 | 12.18 | | | + |
| 7 | 17.05 | MMM-1 | 4.66 | 3.06 | | 9.32 | + |
| 10 | 17.05 | MMM-1 | 4.66 | 3.06 | 9.32 | | + |
| 12 | 7.31 | MMM-1 | 2 | 1.31 | | 4 | + |
| 15 | 7.31 | MMM-1 | 2 | 1.31 | 4 | | + |

Table 6 shows that films of the disclosure comprising PVOH copolymers comprising an anionic monomer having a pendant carboxyl group and having a first plasticizer comprising sorbitol and a second plasticizer comprising glycerol and at least one of trimethylolpropane or diglycerol, and having a total amount of plasticizer in the range of 12 PHR to 20 PHR are convertible into sealed pouches. Further, films of the disclosure comprising PVOH copolymers including an anionic monomer having a pendant carboxyl group and having a first plasticizer comprising sorbitol and a second plasticizer comprising glycerol and at least one of trimethylolpropane and diglycerol, and having a total amount of plasticizer of less than 12 phr are convertible into sealed pouches. Table 6 further shows that films comprising PVOH copolymers having an anionic monomer having a pendant carboxyl group, the film further including a total plasticizer amount of greater than 20 PHR wherein at least ⅓ of the total amount of plasticizer is sorbitol, are convertible into pouches. Further, as shown in Tables 1 and 2, the films that were successfully converted into pouches by VFFS are also compatible with trichloroisocyanurate. Thus, Tables 1, 2, and 6 demonstrate films of the disclosure that advantageously are stable to harsh oxidizing chemicals while maintaining the ability to be formed into pouches/packets.

The foregoing description is given for clearness of understanding only, and no unnecessary limitations should be understood therefrom, as modifications within the scope of the invention may be apparent to those having ordinary skill in the art.

All patents, publications and references cited herein are hereby fully incorporated by reference. In case of conflict between the present disclosure and incorporated patents, publications and references, the present disclosure should control.

What is claimed:

1. A water-soluble film comprising a mixture of a water-soluble polyvinyl alcohol copolymer, the copolymer including an anionic monomer having a pendant carboxyl group, and a plasticizer blend comprising a first plasticizer comprising sorbitol and a secondary plasticizer selected from the group consisting of glycerol, trimethylolpropane, diglycerol, glycerol propylene oxide polymers, glycerol diacetate, 2-methyl-1,3-propanediol and a combination thereof, wherein
   (i) when the total amount of plasticizer included in the film is less than 12 PHR, then the plasticizer blend comprises sorbitol, glycerol, and at least one additional secondary plasticizer;
   (ii) when the total amount of plasticizer included in the film is at least 12 PHR and less than 20 PHR, then the plasticizer blend comprises sorbitol, glycerol, and at least one additional secondary plasticizer selected from diglycerol, trimethylolpropane and a combination thereof; and
   (iii) when the total amount of plasticizer included in the film is 20 PHR or greater, then the sorbitol comprises at least ⅓ of the total amount of plasticizer (by weight);
wherein the total amount of plasticizer included in the film is less than 12 PHR.

2. The water-soluble film of claim 1, wherein glycerol is included in the film in an amount of at least 2.0 wt. %, based on the total weight of the film.

3. The water-soluble film of claim 1, wherein the total amount of plasticizer in the film is at least 2 PHR.

4. The water-soluble film of claim 1, wherein the total amount of plasticizer is less than about 10 PHR.

5. The water-soluble film of claim 1, wherein a film having the identical composition and a thickness of about 2 mil (about 0.05 mm), dissolves in 600 seconds or less in water at a temperature of 20° C. (68° F.) in accordance with MonoSol Test Method MSTM-205 after storing in contact with a harsh chemical oxidizing agent for 6 weeks at 23° C. and 35% relative humidity (RH).

6. The water-soluble film of claim 1, further comprising a filler, a surfactant, an anti-block agent or combinations of the foregoing.

7. The water-soluble film of claim 1, wherein the anionic monomer comprises monomethyl maleate, the total plasticizer present in the film is in a range of 7 to 8 PHR, and the plasticizer blend consists essentially of glycerol, sorbitol, and diglycerol.

8. The water-soluble film of claim 1, wherein the anionic monomer comprises monomethyl maleate, the total plasticizer present in the film is in a range of 7 to 8 PHR, and the plasticizer blend consists essentially of glycerol, sorbitol, and trimethylolpropane.

9. The water-soluble film of claim 1, wherein the total amount of plasticizer in the film is at least 5 PHR.

10. The water-soluble film of claim 1, wherein the total amount of plasticizer in the film is at least 6.5 PHR.

11. The water-soluble film of claim 1, wherein the total amount of plasticizer in the film is less than about 8 PHR.

12. The water-soluble film of claim 1, wherein the total amount of plasticizer in the film is less than about 7.5 PHR.

13. The water-soluble film of claim 1, wherein the PVOH copolymer comprises a degree of hydrolysis in a range of 89 to 97.

14. The water-soluble film of claim 1, wherein the PVOH copolymer comprises a degree of hydrolysis in a range 90 to 96.

15. The water-soluble film of claim 1, wherein the anionic monomer unit is selected from the group consisting of vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, alkali metal salts of the foregoing, esters of the foregoing, and combinations of the foregoing.

16. The water-soluble film of claim 15, wherein the anionic monomer unit comprises one or more of maleic acid, monoalkyl maleate, dialkyl maleate, monomethyl maleate, dimethyl maleate, maleic anhydride, alkali metal salts of the foregoing, esters of the forgoing, and combinations thereof.

17. The water-soluble film of claim 16, wherein the anionic monomer unit is selected from the group consisting of maleic acid, monomethyl maleate, dimethyl maleate, maleic anhydride, alkali metal salts of the foregoing, esters of the foregoing, and combinations thereof.

18. The water-soluble film of claim 1, wherein the PVOH copolymer comprises a degree of hydrolysis in a range of 87 to 98.

19. The water-soluble film of claim 18, wherein the PVOH copolymer has a degree of hydrolysis in a range of 94 to 98.

20. The water-soluble film of claim 19, wherein the PVOH copolymer has a degree of hydrolysis of 96.

21. The water-soluble film of claim 1, further comprising an antioxidant.

22. The water-soluble film of claim 21, wherein the antioxidant is selected from the group consisting of sodium metabisulfite, propyl gallate, citric acid, and combinations thereof.

23. A sealed article comprising the water-soluble film of claim 1.

24. The sealed article of claim 23, wherein the article is a vertical form, filled, and sealed article.

25. A sealed pouch comprising the film of claim 1 that encloses an oxidizing composition.

26. The sealed pouch of claim 25, wherein the oxidizing composition is a chlorinated or brominated composition.

27. The sealed pouch of claim 25, wherein the oxidizing composition comprises an oxidizing agent selected from the group consisting of sodium hypochlorite, calcium hypochlorite, lithium hypochlorite, dichloroisocyanuric acid, trichloroisocyanuric acid, trichloroisocyanurate (TC), salts and hydrates of the foregoing, 1,3-dibromo-5,5-dimethylhydantoin (DBDMH), 2,2-dibromo-3-nitrilopropionamide (DB-NPA), dibromocyano acetic acid amide, 1-bromo-3-chloro-5,5-dimethylhydantoin (BCDMH), 2-bromo-2-nitro-1,3-propanediol, and combinations thereof.

28. The sealed pouch of claim 25, wherein the oxidizing composition comprises an oxidizing agent selected from the group consisting of trichloroisocyanurate, 1-bromo-3-chloro-5,5-dimethylhydantoin, and combinations thereof.

29. The sealed pouch of claim 25, wherein the pouch is a vertical form, filled, and sealed pouch.

30. The sealed pouch of claim 29, wherein the pouch has an interior volume of at least about 25 ml.

31. The sealed pouch of claim 29, wherein the pouch has a length of at least about 12.5 cm (about 5 inches).

32. The sealed pouch of claim 29, wherein the pouch has an interior volume of at least about 100 ml.

33. The sealed pouch of claim 29, wherein the pouch has an interior volume of at least about 150 ml.

34. The sealed pouch of claim 29, wherein the pouch has an interior volume of at least about 200 ml.

35. The sealed pouch of claim 29, wherein the pouch has an interior volume of at least about 250 ml.

36. The sealed pouch of claim 29, wherein the pouch has an interior volume of at least about 300 ml.

37. The sealed pouch of claim 29, wherein the pouch has a length of at least about 18 cm (about 7 inches).

38. The sealed pouch of claim 29, wherein the pouch has a length of at least about 23 cm (about 9 inches).

39. A water-soluble film comprising a mixture of a water-soluble polyvinyl alcohol copolymer, the copolymer including an anionic monomer having a pendant carboxyl group, and a plasticizer blend comprising a first plasticizer comprising sorbitol and a secondary plasticizer selected from the group consisting of glycerol, trimethylolpropane, diglycerol, glycerol propylene oxide polymers, glycerol diacetate, 2-methyl-1,3-propanediol and a combination thereof, wherein
(i) when the total amount of plasticizer included in the film is less than 12 PHR, then the plasticizer blend comprises sorbitol, glycerol, and at least one additional secondary plasticizer;
(ii) when the total amount of plasticizer included in the film is at least 12 PHR and less than 20 PHR, then the plasticizer blend comprises sorbitol, glycerol, and at least one additional secondary plasticizer selected from diglycerol, trimethylolpropane and a combination thereof; and
(iii) when the total amount of plasticizer included in the film is 20 PHR or greater, then the sorbitol comprises at least ⅓ of the total amount of plasticizer (by weight);
wherein the total amount of plasticizer included in the film is in a range of about 15 to about 20 PHR.

40. The water-soluble film of claim 39, wherein glycerol is included in the film in an amount of at least 2.0 wt. %, based on the total weight of the film.

41. The water-soluble film of claim 39, wherein the total amount of plasticizer in the film is in a range of about 16 to 18 PHR.

42. The water-soluble film of claim 39, wherein a film having the identical composition and a thickness of about 2 mil (about 0.05 mm), dissolves in 600 seconds or less in water at a temperature of 20° C. (68° F.) in accordance with MonoSol Test Method MSTM-205 after storing in contact with a harsh chemical oxidizing agent for 6 weeks at 23° C. and 35% relative humidity (RH).

43. The water-soluble film of claim 39, further comprising a filler, a surfactant, an anti-block agent or combinations of the foregoing.

44. The water-soluble film of claim 39, wherein the anionic monomer comprises monomethyl maleate, the total plasticizer present in the film is in a range of 16.5 to 17.5 PHR, and the plasticizer blend consists essentially of glycerol, sorbitol, and diglycerol.

45. The water-soluble film of claim 39, wherein the anionic monomer comprises monomethyl maleate, the total plasticizer present in the film is in a range of 16.5 to 17.5 PHR, and the plasticizer blend consists essentially of glycerol, sorbitol, and trimethylolpropane.

46. The water-soluble film of claim 39, wherein the PVOH copolymer comprises a degree of hydrolysis in a range of 89 to 97.

47. The water-soluble film of claim 39, wherein the PVOH copolymer comprises a degree of hydrolysis in a range 90 to 96.

48. The water-soluble film of claim 39, wherein the anionic monomer unit is selected from the group consisting of vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, alkali metal salts of the foregoing, esters of the foregoing, and combinations of the foregoing.

49. The water-soluble film of claim 48, wherein the anionic monomer unit comprises one or more of maleic acid, monoalkyl maleate, dialkyl maleate, monomethyl maleate, dimethyl maleate, maleic anhydride, alkali metal salts of the foregoing, esters of the forgoing, and combinations thereof.

50. The water-soluble film of claim 49, wherein the anionic monomer unit is selected from the group consisting of maleic acid, monomethyl maleate, dimethyl maleate, maleic anhydride, alkali metal salts of the foregoing, esters of the foregoing, and combinations thereof.

51. The water-soluble film of claim 39, wherein the PVOH copolymer comprises a degree of hydrolysis in a range of 87 to 98.

52. The water-soluble film of claim 51, wherein the PVOH copolymer has a degree of hydrolysis in a range of 94 to 98.

53. The water-soluble film of claim 52, wherein the PVOH copolymer has a degree of hydrolysis of 96.

54. The water-soluble film of claim 39, further comprising an antioxidant.

55. The water-soluble film of claim 54, wherein the antioxidant is selected from the group consisting of sodium metabisulfite, propyl gallate, citric acid, and combinations thereof.

56. A sealed article comprising the water-soluble film of claim 39.

57. The sealed article of claim 56, wherein the article is a vertical form, filled, and sealed article.

58. A sealed pouch comprising the film of claim 39 that encloses an oxidizing composition.

59. The sealed pouch of claim 58, wherein the oxidizing composition is a chlorinated or brominated composition.

60. The sealed pouch of claim 58, wherein the oxidizing composition comprises an oxidizing agent selected from the group consisting of sodium hypochlorite, calcium hypochlorite, lithium hypochlorite, dichloroisocyanuric acid, trichloroisocyanuric acid, trichloroisocyanurate (TC), salts and hydrates of the foregoing, 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin (BCDMH), 2-bromo-2-nitro-1,3-propanediol, and combinations thereof.

61. The sealed pouch of claim 60, wherein the oxidizing composition comprises an oxidizing agent selected from the group consisting of trichloroisocyanurate, 1-bromo-3-chloro-5,5-dimethylhydantoin, and combinations thereof.

62. The sealed pouch of claim 58, wherein the pouch is a vertical form, filled, and sealed pouch.

63. The sealed pouch of claim 62, wherein the pouch has an interior volume of at least about 25 ml.

64. The sealed pouch of claim 62, wherein the pouch has a length of at least about 12.5 cm (about 5 inches).

65. The sealed pouch of claim 62, wherein the pouch has an interior volume of at least about 100 ml.

66. The sealed pouch of claim 62, wherein the pouch has an interior volume of at least about 150 ml.

67. The sealed pouch of claim 62, wherein the pouch has an interior volume of at least about 200 ml.

68. The sealed pouch of claim 62, wherein the pouch has an interior volume of at least about 250 ml.

69. The sealed pouch of claim 62, wherein the pouch has an interior volume of at least about 300 ml.

70. The sealed pouch of claim 62, wherein the pouch has a length of at least about 18 cm (about 7 inches).

71. The sealed pouch of claim 62, wherein the pouch has a length of at least about 23 cm (about 9 inches).

72. A water-soluble film comprising a mixture of a water-soluble polyvinyl alcohol copolymer, the copolymer including an anionic monomer having a pendant carboxyl group, and a plasticizer blend comprising a first plasticizer comprising sorbitol and a secondary plasticizer selected from the group consisting of glycerol, trimethylolpropane, diglycerol, glycerol propylene oxide polymers, glycerol diacetate, 2-methyl-1,3-propanediol and a combination thereof, wherein
  (i) when the total amount of plasticizer included in the film is less than 12 PHR, then the plasticizer blend comprises sorbitol, glycerol, and at least one additional secondary plasticizer;
  (ii) when the total amount of plasticizer included in the film is at least 12 PHR and less than 20 PHR, then the plasticizer blend comprises sorbitol, glycerol, and at least one additional secondary plasticizer selected from diglycerol, trimethylolpropane and a combination thereof; and
  (iii) when the total amount of plasticizer included in the film is 20 PHR or greater, then the sorbitol comprises at least ⅓ of the total amount of plasticizer (by weight);
wherein the total amount of plasticizer included in the film is in a range of about 21 PHR to about 27 PHR.

73. The water-soluble film of claim 72, wherein when glycerol is included in the film it is included in an amount of at least 2.0 wt. %, based on the total weight of the film.

74. The water-soluble film of claim 72, wherein the total amount of plasticizer in the film is in a range of about 23 to 25 PHR.

75. The water-soluble film of claim 72, wherein a film having the identical composition and a thickness of about 2 mil (about 0.05 mm), dissolves in 600 seconds or less in water at a temperature of 20° C. (68° F.) in accordance with MonoSol Test Method MSTM-205 after storing in contact with a harsh chemical oxidizing agent for 6 weeks at 23° C. and 35% relative humidity (RH).

76. The water-soluble film of claim 72, further comprising a filler, a surfactant, an anti-block agent or combinations of the foregoing.

77. The water-soluble film of claim 72, wherein the anionic monomer comprises monomethyl maleate, the total plasticizer present in the film is in a range of 24 to 25 PHR, and the plasticizer blend consists essentially of a 1:1 wt % mixture of glycerol and sorbitol.

78. The water-soluble film of claim 72, wherein the anionic monomer comprises monomethyl maleate, the total plasticizer present in the film is in a range of 24 to 25 PHR, and the plasticizer blend consists essentially of a 1:1 wt % mixture of trimethylolpropane and sorbitol.

79. The water-soluble film of claim 72, wherein the anionic monomer comprises monomethyl maleate, the total plasticizer present in the film is in a range of 24 to 25 PHR, and the plasticizer blend consists essentially of a 1:1:1 wt % mixture trimethylolpropane, glycerol and sorbitol.

80. The water-soluble film of claim 72, wherein the PVOH copolymer comprises a degree of hydrolysis in a range of 89 to 97.

81. The water-soluble film of claim 72, wherein the PVOH copolymer comprises a degree of hydrolysis in a range 90 to 96.

82. The water-soluble film of claim 72, wherein the anionic monomer unit is selected from the group consisting of vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, alkali metal salts of the foregoing, esters of the foregoing, and combinations of the foregoing.

83. The water-soluble film of claim 82, wherein the anionic monomer unit comprises one or more of maleic acid, monoalkyl maleate, dialkyl maleate, monomethyl maleate, dimethyl maleate, maleic anhydride, alkali metal salts of the foregoing, esters of the forgoing, and combinations thereof.

84. The water-soluble film of claim 83, wherein the anionic monomer unit is selected from the group consisting of maleic acid, monomethyl maleate, dimethyl maleate, maleic anhydride, alkali metal salts of the foregoing, esters of the foregoing, and combinations thereof.

85. The water-soluble film of claim 72, wherein the PVOH copolymer comprises a degree of hydrolysis in a range of 87 to 98.

86. The water-soluble film of claim 85, wherein the PVOH copolymer has a degree of hydrolysis in a range of 94 to 98.

87. The water-soluble film of claim 86, wherein the PVOH copolymer has a degree of hydrolysis of 96.

88. The water-soluble film of claim 72, further comprising an antioxidant.

89. The water-soluble film of claim 88, wherein the antioxidant is selected from the group consisting of sodium metabisulfite, propyl gallate, citric acid, and combinations thereof.

90. A sealed article comprising the water-soluble film of claim 72.

91. The sealed article of claim 90, wherein the article is a vertical form, filled, and sealed article.

92. A sealed pouch comprising the film of claim 72 that encloses an oxidizing composition.

93. The sealed pouch of claim 92, wherein the oxidizing composition is a chlorinated or brominated composition.

94. The sealed pouch of claim 92, wherein the oxidizing composition comprises an oxidizing agent selected from the group consisting of sodium hypochlorite, calcium hypochlorite, lithium hypochlorite, dichloroisocyanuric acid, trichloroisocyanuric acid, trichloroisocyanurate (TC), salts and hydrates of the foregoing, 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin (BCDMH), 2-bromo-2-nitro-1,3-propanediol, and combinations thereof.

95. The sealed pouch of claim 92, wherein the oxidizing composition comprises an oxidizing agent selected from the group consisting of trichloroisocyanurate, 1-bromo-3-chloro-5,5-dimethylhydantoin, and combinations thereof.

96. The sealed pouch of claim 92, wherein the pouch is a vertical form, filled, and sealed pouch.

97. The sealed pouch of claim 96, wherein the pouch has an interior volume of at least about 25 ml.

98. The sealed pouch of claim 96, wherein the pouch has a length of at least about 12.5 cm (about 5 inches).

99. The sealed pouch of claim 96, wherein the pouch has an interior volume of at least about 100 ml.

100. The sealed pouch of claim 96, wherein the pouch has an interior volume of at least about 150 ml.

101. The sealed pouch of claim 96, wherein the pouch has an interior volume of at least about 200 ml.

102. The sealed pouch of claim 96, wherein the pouch has an interior volume of at least about 250 ml.

103. The sealed pouch of claim 96, wherein the pouch has an interior volume of at least about 300 ml.

104. The sealed pouch of claim 96, wherein the pouch has a length of at least about 18 cm (about 7 inches).

105. The sealed pouch of claim 96, wherein the pouch has a length of at least about 23 cm (about 9 inches).

106. A water-soluble film comprising a mixture of a water-soluble polyvinyl alcohol copolymer, the copolymer including an anionic monomer having a pendant carboxyl group, and a plasticizer blend comprising a first plasticizer comprising sorbitol and a secondary plasticizer selected from the group consisting of glycerol, trimethylolpropane, diglycerol, glycerol propylene oxide polymers, glycerol diacetate, 2-methyl-1,3-propanediol and a combination thereof, wherein
  (i) when the total amount of plasticizer included in the film is less than 12 PHR, then the plasticizer blend comprises sorbitol, glycerol, and at least one additional secondary plasticizer;
  (ii) when the total amount of plasticizer included in the film is at least 12 PHR and less than 20 PHR, then the plasticizer blend comprises sorbitol, glycerol, and at least one additional secondary plasticizer selected from diglycerol, trimethylolpropane and a combination thereof; and
  (iii) when the total amount of plasticizer included in the film is 20 PHR or greater, then the sorbitol comprises at least ⅓ of the total amount of plasticizer (by weight),
wherein the PVOH copolymer has a degree of hydrolysis in a range of 94 to 98.

107. The water-soluble film of claim 106, wherein when glycerol is included in the film it is included in an amount of at least 2.0 wt. %, based on the total weight of the film.

108. The water-soluble film of claim 106, wherein the total amount of plasticizer in the film is at least 2 PHR.

109. The water-soluble film of claim 106, wherein the total amount of plasticizer is less than about 12 PHR.

110. The water-soluble film of claim 106, wherein the total amount of plasticizer in the film is in a range of about 15 to about 20 PHR.

111. The water-soluble film of claim 106, wherein the total amount of plasticizer in the film is in a range of about 21 PHR to about 27 PHR.

112. The water-soluble film of claim 106, wherein the PVOH copolymer has a degree of hydrolysis of 96.

113. The water-soluble film of claim 106, wherein a film having the identical composition and a thickness of about 2 mil (about 0.05 mm), dissolves in 600 seconds or less in water at a temperature of 20° C. (68° F.) in accordance with MonoSol Test Method MSTM-205 after storing in contact with a harsh chemical oxidizing agent for 6 weeks at 23° C. and 35% relative humidity (RH).

114. The water-soluble film of claim 106, further comprising a filler, a surfactant, an anti-block agent or combinations of the foregoing.

115. The water-soluble film of claim 106, wherein the anionic monomer comprises monomethyl maleate, the total plasticizer present in the film is in a range of 7 to 8 PHR, and the plasticizer blend consists essentially of glycerol, sorbitol, and diglycerol.

116. The water-soluble film of claim 106, wherein the anionic monomer comprises monomethyl maleate, the total plasticizer present in the film is in a range of 7 to 8 PHR, and the plasticizer blend consists essentially of glycerol, sorbitol, and trimethylolpropane.

117. The water-soluble film of claim 106, wherein the anionic monomer comprises monomethyl maleate, the total plasticizer present in the film is in a range of 24 to 25 PHR, and the plasticizer blend consists essentially of a 1:1 wt % mixture of glycerol and sorbitol.

118. The water-soluble film of claim 106, wherein the anionic monomer comprises monomethyl maleate, the total plasticizer present in the film is in a range of 24 to 25 PHR, and the plasticizer blend consists essentially of a 1:1 wt % mixture of trimethylolpropane and sorbitol.

119. The water-soluble film of claim 106, wherein the anionic monomer comprises monomethyl maleate, the total plasticizer present in the film is in a range of 24 to 25 PHR, and the plasticizer blend consists essentially of a 1:1:1 wt % mixture trimethylolpropane, glycerol and sorbitol.

120. The water-soluble film of claim 106, wherein the anionic monomer comprises monomethyl maleate, the total plasticizer present in the film is in a range of 16.5 to 17.5 PHR, and the plasticizer blend consists essentially of glycerol, sorbitol, and diglycerol.

121. The water-soluble film of claim 106, wherein the anionic monomer comprises monomethyl maleate, the total plasticizer present in the film is in a range of 16.5 to 17.5 PHR, and the plasticizer blend consists essentially of glycerol, sorbitol, and trimethylolpropane.

122. The water-soluble film of claim 106, wherein the total amount of plasticizer in the film is at least 5 PHR.

123. The water-soluble film of claim 106, wherein the total amount of plasticizer in the film is at least 6.5 PHR.

124. The water-soluble film of claim 106, wherein the total amount of plasticizer in the film is less than about 10 PHR.

125. The water-soluble film of claim 106, wherein the total amount of plasticizer in the film is less than about 8 PHR.

126. The water-soluble film of claim 106, wherein the total amount of plasticizer in the film is less than about 7.5 PHR.

127. The water-soluble film of claim 106, wherein the total amount of plasticizer in the film is in a range of about 16 to about 18 PHR.

128. The water-soluble film of claim 106, wherein the total amount of plasticizer in the film is in a range of about 23 to 25 PHR.

129. The water-soluble film of claim 106, wherein the anionic monomer unit is selected from the group consisting of vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, alkali metal salts of the foregoing, esters of the foregoing, and combinations of the foregoing.

130. The water-soluble film of claim 129, wherein the anionic monomer unit comprises one or more of maleic acid, monoalkyl maleate, dialkyl maleate, monomethyl maleate, dimethyl maleate, maleic anhydride, alkali metal salts of the foregoing, esters of the forgoing, and combinations thereof.

131. The water-soluble film of claim 130, wherein the anionic monomer unit is selected from the group consisting of maleic acid, monomethyl maleate, dimethyl maleate, maleic anhydride, alkali metal salts of the foregoing, esters of the foregoing, and combinations thereof.

132. The water-soluble film of claim 106, further comprising an antioxidant.

133. The water-soluble film of claim 132, wherein the antioxidant is selected from the group consisting of sodium metabisulfite, propyl gallate, citric acid, and combinations thereof.

134. A sealed article comprising the water-soluble film of claim 106.

135. The sealed article of claim 134, wherein the article is a vertical form, filled, and sealed article.

136. A sealed pouch comprising the film of claim 106 that encloses an oxidizing composition.

137. The sealed pouch of claim 136, wherein the oxidizing composition is a chlorinated or brominated composition.

138. The sealed pouch of claim 136, wherein the oxidizing composition comprises an oxidizing agent selected from the group consisting of sodium hypochlorite, calcium hypochlorite, lithium hypochlorite, dichloroisocyanuric acid, trichloroisocyanuric acid, trichloroisocyanurate (TC), salts and hydrates of the foregoing, 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin (BCDMH), 2-bromo-2-nitro-1,3-propanediol, and combinations thereof.

139. The sealed pouch of claim 136, wherein the oxidizing composition comprises an oxidizing agent selected from the group consisting of trichloroisocyanurate, 1-bromo-3-chloro-5,5-dimethylhydantoin, and combinations thereof.

140. The sealed pouch of claim 136, wherein the pouch is a vertical form, filled, and sealed pouch.

141. The sealed pouch of claim 140, wherein the pouch has an interior volume of at least about 25 ml.

142. The sealed pouch of claim 140, wherein the pouch has a length of at least about 12.5 cm (about 5 inches).

143. The sealed pouch of claim 140, wherein the pouch has an interior volume of at least about 100 ml.

144. The sealed pouch of claim 140, wherein the pouch has an interior volume of at least about 150 ml.

145. The sealed pouch of claim 140, wherein the pouch has an interior volume of at least about 200 ml.

146. The sealed pouch of claim 140, wherein the pouch has an interior volume of at least about 250 ml.

147. The sealed pouch of claim 140, wherein the pouch has an interior volume of at least about 300 ml.

148. The sealed pouch of claim 140, wherein the pouch has a length of at least about 18 cm (about 7 inches).

149. The sealed pouch of claim 140, wherein the pouch has a length of at least about 23 cm (about 9 inches).

150. A water-soluble film comprising a mixture of a water-soluble polyvinyl alcohol copolymer, the copolymer including an anionic monomer comprising monomethyl maleate, and a plasticizer blend comprising a first plasticizer comprising sorbitol and a secondary plasticizer selected from the group consisting of glycerol, trimethylolpropane, diglycerol, glycerol propylene oxide polymers, glycerol diacetate, 2-methyl-1,3-propanediol and a combination thereof, wherein
(i) when the total amount of plasticizer included in the film is less than 12 PHR, then the plasticizer blend comprises sorbitol, glycerol, and at least one additional secondary plasticizer;
(ii) when the total amount of plasticizer included in the film is at least 12 PHR and less than 20 PHR, then the plasticizer blend comprises sorbitol, glycerol, and at least one additional secondary plasticizer selected from diglycerol, trimethylolpropane and a combination thereof; and
(iii) when the total amount of plasticizer included in the film is 20 PHR or greater, then the sorbitol comprises at least ⅓ of the total amount of plasticizer (by weight);
wherein the total amount of plasticizer included in the film is in a range of 7 to 8 PHR, and the plasticizer blend consists essentially of sorbitol, glycerol, and diglycerol.

151. The water-soluble film of claim 150, wherein glycerol is included in the film in an amount of at least 2.0 wt. %, based on the total weight of the film.

152. The water-soluble film of claim 150 wherein a film having the identical composition and a thickness of about 2 mil (about 0.05 mm), dissolves in 600 seconds or less in water at a temperature of 20° C. (68° F.) in accordance with MonoSol Test Method MSTM-205 after storing in contact with a harsh chemical oxidizing agent for 6 weeks at 23° C. and 35% relative humidity (RH).

153. The water-soluble film of claim 150, further comprising a filler, a surfactant, an anti-block agent or combinations of the foregoing.

154. The water-soluble film of claim 150, wherein the PVOH copolymer comprises a degree of hydrolysis in a range of 89 to 97.

155. The water-soluble film of claim 150, wherein the PVOH copolymer comprises a degree of hydrolysis in a range 90 to 96.

156. The water-soluble film of claim 150, wherein the anionic monomer unit further comprises vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, alkali metal salts of the foregoing, esters of the foregoing, or combinations of the foregoing.

157. The water-soluble film of claim 156, wherein the anionic monomer unit comprises one or more of maleic acid, monoalkyl maleate, dialkyl maleate, monomethyl maleate, dimethyl maleate, maleic anhydride, alkali metal salts of the foregoing, esters of the forgoing, and combinations thereof.

158. The water-soluble film of claim 157, wherein the anionic monomer unit is selected from the group consisting of maleic acid, monomethyl maleate, dimethyl maleate, maleic anhydride, alkali metal salts of the foregoing, esters of the foregoing, and combinations thereof.

159. The water-soluble film of claim 150, wherein the PVOH copolymer comprises a degree of hydrolysis in a range of 87 to 98.

160. The water-soluble film of claim 159, wherein the PVOH copolymer has a degree of hydrolysis in a range of 94 to 98.

161. The water-soluble film of claim 160, wherein the PVOH copolymer has a degree of hydrolysis of 96.

162. The water-soluble film of claim 150, further comprising an antioxidant.

163. The water-soluble film of claim 162, wherein the antioxidant is selected from the group consisting of sodium metabisulfite, propyl gallate, citric acid, and combinations thereof.

164. A sealed article comprising the water-soluble film of claim 150.

165. The sealed article of claim 164, wherein the article is a vertical form, filled, and sealed article.

166. A sealed pouch comprising the film of claim 150 that encloses an oxidizing composition.

167. The sealed pouch of claim 166, wherein the oxidizing composition is a chlorinated or brominated composition.

168. The sealed pouch of claim 166, wherein the oxidizing composition comprises an oxidizing agent selected from the group consisting of sodium hypochlorite, calcium hypochlorite, lithium hypochlorite, dichloroisocyanuric acid, trichloroisocyanuric acid, trichloroisocyanurate (TC), salts and hydrates of the foregoing, 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin (BCDMH), 2-bromo-2-nitro-1,3-propanediol, and combinations thereof.

169. The sealed pouch of claim 166, wherein the oxidizing composition comprises an oxidizing agent selected from the group consisting of trichloroisocyanurate, 1-bromo-3-chloro-5,5-dimethylhydantoin, and combinations thereof.

170. The sealed pouch of claim 166, wherein the pouch is a vertical form, filled, and sealed pouch.

171. The sealed pouch of claim 170, wherein the pouch has an interior volume of at least about 25 ml.

172. The sealed pouch of claim 170, wherein the pouch has a length of at least about 12.5 cm (about 5 inches).

173. The sealed pouch of claim 170, wherein the pouch has an interior volume of at least about 100 ml.

174. The sealed pouch of claim 170, wherein the pouch has an interior volume of at least about 150 ml.

175. The sealed pouch of claim 170, wherein the pouch has an interior volume of at least about 200 ml.

176. The sealed pouch of claim 170, wherein the pouch has an interior volume of at least about 250 ml.

177. The sealed pouch of claim 170, wherein the pouch has an interior volume of at least about 300 ml.

178. The sealed pouch of claim 170, wherein the pouch has a length of at least about 18 cm (about 7 inches).

179. The sealed pouch of claim 170, wherein the pouch has a length of at least about 23 cm (about 9 inches).

180. A water-soluble film comprising a mixture of a water-soluble polyvinyl alcohol copolymer, the copolymer including an anionic monomer comprising monomethyl maleate, and a plasticizer blend comprising a first plasticizer comprising sorbitol and a secondary plasticizer selected from the group consisting of glycerol, trimethylolpropane, diglycerol, glycerol propylene oxide polymers, glycerol diacetate, 2-methyl-1,3-propanediol and a combination thereof, wherein
(i) when the total amount of plasticizer included in the film is less than 12 PHR, then the plasticizer blend comprises sorbitol, glycerol, and at least one additional secondary plasticizer;
(ii) when the total amount of plasticizer included in the film is at least 12 PHR and less than 20 PHR, then the plasticizer blend comprises sorbitol, glycerol, and at least one additional secondary plasticizer selected from diglycerol, trimethylolpropane and a combination thereof; and
(iii) when the total amount of plasticizer included in the film is 20 PHR or greater, then the sorbitol comprises at least ⅓ of the total amount of plasticizer (by weight);
wherein the total amount of plasticizer included in the film is in a range of 7 to 8 PHR, and the plasticizer blend consists essentially of sorbitol, glycerol, and trimethylolpropane.

181. The water-soluble film of claim 180, wherein glycerol is included in the film in an amount of at least 2.0 wt. %, based on the total weight of the film.

182. The water-soluble film of claim 180, wherein a film having the identical composition and a thickness of about 2 mil (about 0.05 mm), dissolves in 600 seconds or less in water at a temperature of 20° C. (68° F.) in accordance with MonoSol Test Method MSTM-205 after storing in contact with a harsh chemical oxidizing agent for 6 weeks at 23° C. and 35% relative humidity (RH).

183. The water-soluble film of claim 180, further comprising a filler, a surfactant, an anti-block agent or combinations of the foregoing.

184. The water-soluble film of claim 180, wherein the PVOH copolymer comprises a degree of hydrolysis in a range of 89 to 97.

185. The water-soluble film of claim 180, wherein the PVOH copolymer comprises a degree of hydrolysis in a range 90 to 96.

186. The water-soluble film of claim 180, wherein the anionic monomer unit further comprises vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, alkali metal salts of the foregoing, esters of the foregoing, or combinations of the foregoing.

187. The water-soluble film of claim 186, wherein the anionic monomer unit comprises one or more of maleic acid, monoalkyl maleate, dialkyl maleate, monomethyl maleate, dimethyl maleate, maleic anhydride, alkali metal salts of the foregoing, esters of the forgoing, and combinations thereof.

188. The water-soluble film of claim 187, wherein the anionic monomer unit is selected from the group consisting of maleic acid, monomethyl maleate, dimethyl maleate, maleic anhydride, alkali metal salts of the foregoing, esters of the foregoing, and combinations thereof.

189. The water-soluble film of claim 180, wherein the PVOH copolymer comprises a degree of hydrolysis in a range of 87 to 98.

190. The water-soluble film of claim 189, wherein the PVOH copolymer has a degree of hydrolysis in a range of 94 to 98.

191. The water-soluble film of claim 190, wherein the PVOH copolymer has a degree of hydrolysis of 96.

192. The water-soluble film of claim 180, further comprising an antioxidant.

193. The water-soluble film of claim 192, wherein the antioxidant is selected from the group consisting of sodium metabisulfite, propyl gallate, citric acid, and combinations thereof.

194. A sealed article comprising the water-soluble film of claim 180.

195. The sealed article of claim 194, wherein the article is a vertical form, filled, and sealed article.

196. A sealed pouch comprising the film of claim 180 that encloses an oxidizing composition.

197. The sealed pouch of claim 196, wherein the oxidizing composition is a chlorinated or brominated composition.

198. The sealed pouch of claim 196, wherein the oxidizing composition comprises an oxidizing agent selected from the group consisting of sodium hypochlorite, calcium hypochlorite, lithium hypochlorite, dichloroisocyanuric acid, trichloroisocyanuric acid, trichloroisocyanurate (TC), salts and hydrates of the foregoing, 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin (BCDMH), 2-bromo-2-nitro-1,3-propanediol, and combinations thereof.

199. The sealed pouch of claim 196, wherein the oxidizing composition comprises an oxidizing agent selected from the group consisting of trichloroisocyanurate, 1-bromo-3-chloro-5,5-dimethylhydantoin, and combinations thereof.

200. The sealed pouch of claim 196, wherein the pouch is a vertical form, filled, and sealed pouch.

201. The sealed pouch of claim 200, wherein the pouch has an interior volume of at least about 25 ml.

202. The sealed pouch of claim 200, wherein the pouch has a length of at least about 12.5 cm (about 5 inches).

203. The sealed pouch of claim 200, wherein the pouch has an interior volume of at least about 100 ml.

204. The sealed pouch of claim 200, wherein the pouch has an interior volume of at least about 150 ml.

205. The sealed pouch of claim 200, wherein the pouch has an interior volume of at least about 200 ml.

206. The sealed pouch of claim 200, wherein the pouch has an interior volume of at least about 250 ml.

207. The sealed pouch of claim 200, wherein the pouch has an interior volume of at least about 300 ml.

208. The sealed pouch of claim 200, wherein the pouch has a length of at least about 18 cm (about 7 inches).

209. The sealed pouch of claim 200, wherein the pouch has a length of at least about 23 cm (about 9 inches).

210. A water-soluble film comprising a mixture of a water-soluble polyvinyl alcohol copolymer, the copolymer including an anionic monomer comprising monomethyl maleate, and a plasticizer blend comprising a first plasticizer comprising sorbitol and a secondary plasticizer selected from the group consisting of glycerol, trimethylolpropane, diglycerol, glycerol propylene oxide polymers, glycerol diacetate, 2-methyl-1,3-propanediol and a combination thereof, wherein
(i) when the total amount of plasticizer included in the film is less than 12 PHR, then the plasticizer blend comprises sorbitol, glycerol, and at least one additional secondary plasticizer;
(ii) when the total amount of plasticizer included in the film is at least 12 PHR and less than 20 PHR, then the plasticizer blend comprises sorbitol, glycerol, and at least one additional secondary plasticizer selected from diglycerol, trimethylolpropane and a combination thereof; and
(iii) when the total amount of plasticizer included in the film is 20 PHR or greater, then the sorbitol comprises at least ⅓ of the total amount of plasticizer (by weight);
wherein the total amount of plasticizer included in the film is in a range of about 24 to 25 PHR, and the plasticizer blend consists essentially of a 1:1 wt % mixture of sorbitol and glycerol.

211. The water-soluble film of claim 210, wherein glycerol is included in the film in an amount of at least 2.0 wt. %, based on the total weight of the film.

212. The water-soluble film of claim 210, wherein a film having the identical composition and a thickness of about 2 mil (about 0.05 mm), dissolves in 600 seconds or less in water at a temperature of 20° C. (68° F.) in accordance with MonoSol Test Method MSTM-205 after storing in contact with a harsh chemical oxidizing agent for 6 weeks at 23° C. and 35% relative humidity (RH).

213. The water-soluble film of claim 210, further comprising a filler, a surfactant, an anti-block agent or combinations of the foregoing.

214. The water-soluble film of claim 210, wherein the PVOH copolymer comprises a degree of hydrolysis in a range of 89 to 97.

215. The water-soluble film of claim 210, wherein the PVOH copolymer comprises a degree of hydrolysis in a range 90 to 96.

216. The water-soluble film of claim 210, wherein the anionic monomer unit further comprises vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, alkali metal salts of the foregoing, esters of the foregoing, or combinations of the foregoing.

217. The water-soluble film of claim 216, wherein the anionic monomer unit comprises one or more of maleic acid, monoalkyl maleate, dialkyl maleate, monomethyl maleate, dimethyl maleate, maleic anhydride, alkali metal salts of the foregoing, esters of the forgoing, and combinations thereof.

218. The water-soluble film of claim 217, wherein the anionic monomer unit is selected from the group consisting of maleic acid, monomethyl maleate, dimethyl maleate, maleic anhydride, alkali metal salts of the foregoing, esters of the foregoing, and combinations thereof.

219. The water-soluble film of claim 210, wherein the PVOH copolymer comprises a degree of hydrolysis in a range of 87 to 98.

220. The water-soluble film of claim 219, wherein the PVOH copolymer has a degree of hydrolysis in a range of 94 to 98.

221. The water-soluble film of claim 220, wherein the PVOH copolymer has a degree of hydrolysis of 96.

222. The water-soluble film of claim 210, further comprising an antioxidant.

223. The water-soluble film of claim 222, wherein the antioxidant is selected from the group consisting of sodium metabisulfite, propyl gallate, citric acid, and combinations thereof.

224. A sealed article comprising the water-soluble film of claim 210.

225. The sealed article of claim 224, wherein the article is a vertical form, filled, and sealed article.

226. A sealed pouch comprising the film of claim 210 that encloses an oxidizing composition.

227. The sealed pouch of claim 226, wherein the pouch is a vertical form, filled, and sealed pouch.

228. The sealed pouch of claim 227, wherein the oxidizing composition is a chlorinated or brominated composition.

229. The sealed pouch of claim 228, wherein the oxidizing composition comprises an oxidizing agent selected from the group consisting of sodium hypochlorite, calcium hypochlorite, lithium hypochlorite, dichloroisocyanuric acid, trichloroisocyanuric acid, trichloroisocyanurate (TC), salts and hydrates of the foregoing, 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin (BCDMH), 2-bromo-2-nitro-1,3-propanediol, and combinations thereof.

230. The sealed pouch of claim 228, wherein the oxidizing composition comprises an oxidizing agent selected from the group consisting of trichloroisocyanurate, 1-bromo-3-chloro-5,5-dimethylhydantoin, and combinations thereof.

231. The sealed pouch of claim 227, wherein the pouch has an interior volume of at least about 25 ml.

232. The sealed pouch of claim 227, wherein the pouch has a length of at least about 12.5 cm (about 5 inches).

233. The sealed pouch of claim 227, wherein the pouch has an interior volume of at least about 100 ml.

234. The sealed pouch of claim 227, wherein the pouch has an interior volume of at least about 150 ml.

235. The sealed pouch of claim 227, wherein the pouch has an interior volume of at least about 200 ml.

236. The sealed pouch of claim 227, wherein the pouch has an interior volume of at least about 250 ml.

237. The sealed pouch of claim 227, wherein the pouch has an interior volume of at least about 300 ml.

238. The sealed pouch of claim 227, wherein the pouch has a length of at least about 18 cm (about 7 inches).

239. The sealed pouch of claim 227, wherein the pouch has a length of at least about 23 cm (about 9 inches).

240. A water-soluble film comprising a mixture of a water-soluble polyvinyl alcohol copolymer, the copolymer including an anionic monomer comprising monomethyl maleate, and a plasticizer blend comprising a first plasticizer comprising sorbitol and a secondary plasticizer selected from the group consisting of glycerol, trimethylolpropane, diglycerol, glycerol propylene oxide polymers, glycerol diacetate, 2-methyl-1,3-propanediol and a combination thereof, wherein
  (i) when the total amount of plasticizer included in the film is less than 12 PHR, then the plasticizer blend comprises sorbitol, glycerol, and at least one additional secondary plasticizer;
  (ii) when the total amount of plasticizer included in the film is at least 12 PHR and less than 20 PHR, then the plasticizer blend comprises sorbitol, glycerol, and at least one additional secondary plasticizer selected from diglycerol, trimethylolpropane and a combination thereof; and
  (iii) when the total amount of plasticizer included in the film is 20 PHR or greater, then the sorbitol comprises at least ⅓ of the total amount of plasticizer (by weight);
wherein the total amount of plasticizer included in the film is in a range of 24 to 25 PHR, and the plasticizer blend consists essentially of a 1:1 wt. % mixture of sorbitol and trimethylolpropane.

241. The water-soluble film of claim 240, wherein a film having the identical composition and a thickness of about 2 mil (about 0.05 mm), dissolves in 600 seconds or less in water at a temperature of 20° C. (68° F.) in accordance with MonoSol Test Method MSTM-205 after storing in contact with a harsh chemical oxidizing agent for 6 weeks at 23° C. and 35% relative humidity (RH).

242. The water-soluble film of claim 240, further comprising a filler, a surfactant, an anti-block agent or combinations of the foregoing.

243. The water-soluble film of claim 240, wherein the PVOH copolymer comprises a degree of hydrolysis in a range of 89 to 97.

244. The water-soluble film of claim 240, wherein the PVOH copolymer comprises a degree of hydrolysis in a range 90 to 96.

245. The water-soluble film of claim 240, wherein the anionic monomer unit further comprises vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, alkali metal salts of the foregoing, esters of the foregoing, or combinations of the foregoing.

246. The water-soluble film of claim 245, wherein the anionic monomer unit comprises one or more of maleic acid, monoalkyl maleate, dialkyl maleate, monomethyl maleate, dimethyl maleate, maleic anhydride, alkali metal salts of the foregoing, esters of the forgoing, and combinations thereof.

247. The water-soluble film of claim 246, wherein the anionic monomer unit is selected from the group consisting of maleic acid, monomethyl maleate, dimethyl maleate, maleic anhydride, alkali metal salts of the foregoing, esters of the foregoing, and combinations thereof.

248. The water-soluble film of claim 240, wherein the PVOH copolymer comprises a degree of hydrolysis in a range of 87 to 98.

249. The water-soluble film of claim 248, wherein the PVOH copolymer has a degree of hydrolysis in a range of 94 to 98.

250. The water-soluble film of claim 249, wherein the PVOH copolymer has a degree of hydrolysis of 96.

251. The water-soluble film of claim 240, further comprising an antioxidant.

252. The water-soluble film of claim 251, wherein the antioxidant is selected from the group consisting of sodium metabisulfite, propyl gallate, citric acid, and combinations thereof.

253. A sealed article comprising the water-soluble film of claim 240.

254. The sealed article of claim 253, wherein the article is a vertical form, filled, and sealed article.

255. A sealed pouch comprising the film of claim 240 that encloses an oxidizing composition.

256. The sealed pouch of claim 255, wherein the oxidizing composition is a chlorinated or brominated composition.

257. The sealed pouch of claim 255, wherein the oxidizing composition comprises an oxidizing agent selected from the group consisting of sodium hypochlorite, calcium hypochlorite, lithium hypochlorite, dichloroisocyanuric acid, trichloroisocyanuric acid, trichloroisocyanurate (TC), salts and hydrates of the foregoing, 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin (BCDMH), 2-bromo-2-nitro-1,3-propanediol, and combinations thereof.

258. The sealed pouch of claim 255, wherein the oxidizing composition comprises an oxidizing agent selected from the group consisting of trichloroisocyanurate, 1-bromo-3-chloro-5,5-dimethylhydantoin, and combinations thereof.

259. The sealed pouch of claim 255, wherein the pouch is a vertical form, filled, and sealed pouch.

260. The sealed pouch of claim 259, wherein the pouch has an interior volume of at least about 25 ml.

261. The sealed pouch of claim 259, wherein the pouch has a length of at least about 12.5 cm (about 5 inches).

262. The sealed pouch of claim 259, wherein the pouch has an interior volume of at least about 100 ml.

263. The sealed pouch of claim 259, wherein the pouch has an interior volume of at least about 150 ml.

264. The sealed pouch of claim 259, wherein the pouch has an interior volume of at least about 200 ml.

265. The sealed pouch of claim 259, wherein the pouch has an interior volume of at least about 250 ml.

266. The sealed pouch of claim 259, wherein the pouch has an interior volume of at least about 300 ml.

267. The sealed pouch of claim 259, wherein the pouch has a length of at least about 18 cm (about 7 inches).

268. The sealed pouch of claim 259, wherein the pouch has a length of at least about 23 cm (about 9 inches).

269. A water-soluble film comprising a mixture of a water-soluble polyvinyl alcohol copolymer, the copolymer including an anionic monomer comprising monomethyl maleate, and a plasticizer blend comprising a first plasticizer comprising sorbitol and a secondary plasticizer selected from the group consisting of glycerol, trimethylolpropane, diglycerol, glycerol propylene oxide polymers, glycerol diacetate, 2-methyl-1,3-propanediol and a combination thereof, wherein
  (i) when the total amount of plasticizer included in the film is less than 12 PHR, then the plasticizer blend comprises sorbitol, glycerol, and at least one additional secondary plasticizer;
  (ii) when the total amount of plasticizer included in the film is at least 12 PHR and less than 20 PHR, then the plasticizer blend comprises sorbitol, glycerol, and at least one additional secondary plasticizer selected from diglycerol, trimethylolpropane and a combination thereof; and
  (iii) when the total amount of plasticizer included in the film is 20 PHR or greater, then the sorbitol comprises at least ⅓ of the total amount of plasticizer (by weight);
wherein the total amount of plasticizer included in the film is in a range of 24 to 25 PHR, and the plasticizer blend consists essentially of a 1:1:1 wt. % mixture of sorbitol, glycerol, and trimethylolpropane.

270. The water-soluble film of claim 269, wherein glycerol is included in the film in an amount of at least 2.0 wt. %, based on the total weight of the film.

271. The water-soluble film of claim 269, wherein a film having the identical composition and a thickness of about 2 mil (about 0.05 mm), dissolves in 600 seconds or less in water at a temperature of 20° C. (68° F.) in accordance with MonoSol Test Method MSTM-205 after storing in contact with a harsh chemical oxidizing agent for 6 weeks at 23° C. and 35% relative humidity (RH).

272. The water-soluble film of claim 269, further comprising a filler, a surfactant, an anti-block agent or combinations of the foregoing.

273. The water-soluble film of claim 269, wherein the PVOH copolymer comprises a degree of hydrolysis in a range of 89 to 97.

274. The water-soluble film of claim 269, wherein the PVOH copolymer comprises a degree of hydrolysis in a range 90 to 96.

275. The water-soluble film of claim 269, wherein the anionic monomer unit further comprises vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, alkali metal salts of the foregoing, esters of the foregoing, or combinations of the foregoing.

276. The water-soluble film of claim 275, wherein the anionic monomer unit comprises one or more of maleic acid, monoalkyl maleate, dialkyl maleate, monomethyl maleate, dimethyl maleate, maleic anhydride, alkali metal salts of the foregoing, esters of the forgoing, and combinations thereof.

277. The water-soluble film of claim 276, wherein the anionic monomer unit is selected from the group consisting of maleic acid, monomethyl maleate, dimethyl maleate, maleic anhydride, alkali metal salts of the foregoing, esters of the foregoing, and combinations thereof.

278. The water-soluble film of claim 269, wherein the PVOH copolymer comprises a degree of hydrolysis in a range of 87 to 98.

279. The water-soluble film of claim 278, wherein the PVOH copolymer has a degree of hydrolysis in a range of 94 to 98.

280. The water-soluble film of claim 279, wherein the PVOH copolymer has a degree of hydrolysis of 96.

281. The water-soluble film of claim 269, further comprising an antioxidant.

282. The water-soluble film of claim 281, wherein the antioxidant is selected from the group consisting of sodium metabisulfite, propyl gallate, citric acid, and combinations thereof.

283. A sealed article comprising the water-soluble film of claim 269.

284. The sealed article of claim 283, wherein the article is a vertical form, filled, and sealed article.

285. A sealed pouch comprising the film of claim 269 that encloses an oxidizing composition.

286. The sealed pouch of claim 285, wherein the oxidizing composition is a chlorinated or brominated composition.

287. The sealed pouch of claim 285, wherein the oxidizing composition comprises an oxidizing agent selected from the group consisting of sodium hypochlorite, calcium hypochlorite, lithium hypochlorite, dichloroisocyanuric acid, trichloroisocyanuric acid, trichloroisocyanurate (TC), salts and hydrates of the foregoing, 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin (BCDMH), 2-bromo-2-nitro-1,3-propanediol, and combinations thereof.

288. The sealed pouch of claim 285, wherein the oxidizing composition comprises an oxidizing agent selected from the group consisting of trichloroisocyanurate, 1-bromo-3-chloro-5,5-dimethylhydantoin, and combinations thereof.

289. The sealed pouch of claim 285, wherein the pouch is a vertical form, filled, and sealed pouch.

290. The sealed pouch of claim 289, wherein the pouch has an interior volume of at least about 25 ml.

291. The sealed pouch of claim 289, wherein the pouch has a length of at least about 12.5 cm (about 5 inches).

292. The sealed pouch of claim 289, wherein the pouch has an interior volume of at least about 100 ml.

293. The sealed pouch of claim 289, wherein the pouch has an interior volume of at least about 150 ml.

294. The sealed pouch of claim 289, wherein the pouch has an interior volume of at least about 200 ml.

295. The sealed pouch of claim 289, wherein the pouch has an interior volume of at least about 250 ml.

296. The sealed pouch of claim 289, wherein the pouch has an interior volume of at least about 300 ml.

297. The sealed pouch of claim 289, wherein the pouch has a length of at least about 18 cm (about 7 inches).

298. The sealed pouch of claim 289, wherein the pouch has a length of at least about 23 cm (about 9 inches).

299. The water-soluble film of claim 298, wherein the antioxidant is selected from the group consisting of sodium metabisulfite, propyl gallate, citric acid, and combinations thereof.

300. A water-soluble film comprising a mixture of a water-soluble polyvinyl alcohol copolymer, the copolymer including an anionic monomer comprising monomethyl maleate, and a plasticizer comprising a first plasticizer comprising sorbitol and a secondary plasticizer selected from the group consisting of glycerol, trimethylolpropane, diglycerol, glycerol propylene oxide polymers, glycerol diacetate, 2-methyl-1,3-propanediol and a combination thereof, wherein
(i) when the total amount of plasticizer included in the film is less than 12 PHR, then the plasticizer blend comprises sorbitol, glycerol, and at least one additional secondary plasticizer;
(ii) when the total amount of plasticizer included in the film is at least 12 PHR and less than 20 PHR, then the plasticizer blend comprises sorbitol, glycerol, and at least one additional secondary plasticizer selected from diglycerol, trimethylolpropane and a combination thereof; and
(iii) when the total amount of plasticizer included in the film is 20 PHR or greater, then the sorbitol comprises at least ⅓ of the total amount of plasticizer (by weight);
wherein the total amount of plasticizer included in the film is in a range of 16.5 to 17.5 PHR, and the plasticizer blend consists essentially of sorbitol, glycerol, and diglycerol.

301. The water-soluble film of claim 300, wherein glycerol is included in the film in an amount of at least 2.0 wt. %, based on the total weight of the film.

302. The water-soluble film of claim 300, further comprising an antioxidant.

303. The water-soluble film of claim 300, wherein a film having the identical composition and a thickness of about 2 mil (about 0.05 mm), dissolves in 600 seconds or less in water at a temperature of 20° C. (68° F.) in accordance with MonoSol Test Method MSTM-205 after storing in contact with a harsh chemical oxidizing agent for 6 weeks at 23° C. and 35% relative humidity (RH).

304. The water-soluble film of claim 300, further comprising a filler, a surfactant, an anti-block agent or combinations of the foregoing.

305. The water-soluble film of claim 300, wherein the PVOH copolymer comprises a degree of hydrolysis in a range of 89 to 97.

306. The water-soluble film of claim 300, wherein the PVOH copolymer comprises a degree of hydrolysis in a range 90 to 96.

307. The water-soluble film of claim 300, wherein the anionic monomer unit further comprises vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, alkali metal salts of the foregoing, esters of the foregoing, or combinations of the foregoing.

308. The water-soluble film of claim 307, wherein the anionic monomer unit comprises one or more of maleic acid, monoalkyl maleate, dialkyl maleate, monomethyl maleate, dimethyl maleate, maleic anhydride, alkali metal salts of the foregoing, esters of the forgoing, and combinations thereof.

309. The water-soluble film of claim 308, wherein the anionic monomer unit is selected from the group consisting of maleic acid, monomethyl maleate, dimethyl maleate, maleic anhydride, alkali metal salts of the foregoing, esters of the foregoing, and combinations thereof.

310. The water-soluble film of claim 300, wherein the PVOH copolymer comprises a degree of hydrolysis in a range of 87 to 98.

311. The water-soluble film of claim 310, wherein the PVOH copolymer has a degree of hydrolysis in a range of 94 to 98.

312. The water-soluble film of claim 311, wherein the PVOH copolymer has a degree of hydrolysis of 96.

313. A sealed article comprising the water-soluble film of claim 300.

314. The sealed article of claim 313, wherein the article is a vertical form, filled, and sealed article.

315. A sealed pouch comprising the film of claim 300 that encloses an oxidizing composition.

316. The sealed pouch of claim 315, wherein the oxidizing composition is a chlorinated or brominated composition.

317. The sealed pouch of claim 315, wherein the oxidizing composition comprises an oxidizing agent selected from the group consisting of sodium hypochlorite, calcium hypochlorite, lithium hypochlorite, dichloroisocyanuric acid, trichloroisocyanuric acid, trichloroisocyanurate (TC), salts and hydrates of the foregoing, 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin (BCDMH), 2-bromo-2-nitro-1,3-propanediol, and combinations thereof.

318. The sealed pouch of claim 315, wherein the oxidizing composition comprises an oxidizing agent selected from the group consisting of trichloroisocyanurate, 1-bromo-3-chloro-5,5-dimethylhydantoin, and combinations thereof.

319. The sealed pouch of claim 315, wherein the pouch is a vertical form, filled, and sealed pouch.

320. The sealed pouch of claim 319, wherein the pouch has an interior volume of at least about 25 ml.

321. The sealed pouch of claim 319, wherein the pouch has a length of at least about 12.5 cm (about 5 inches).

322. The sealed pouch of claim 319, wherein the pouch has an interior volume of at least about 100 ml.

323. The sealed pouch of claim 319, wherein the pouch has an interior volume of at least about 150 ml.

324. The sealed pouch of claim 319, wherein the pouch has an interior volume of at least about 200 ml.

325. The sealed pouch of claim 319, wherein the pouch has an interior volume of at least about 250 ml.

326. The sealed pouch of claim 319, wherein the pouch has an interior volume of at least about 300 ml.

327. The sealed pouch of claim 319, wherein the pouch has a length of at least about 18 cm (about 7 inches).

328. The sealed pouch of claim 319, wherein the pouch has a length of at least about 23 cm (about 9 inches).

329. A water-soluble film comprising a mixture of a water-soluble polyvinyl alcohol copolymer, the copolymer including an anionic monomer comprising monomethyl maleate, and a plasticizer blend comprising a first plasticizer comprising sorbitol and a secondary plasticizer selected from the group consisting of glycerol, trimethylolpropane, diglycerol, glycerol propylene oxide polymers, glycerol diacetate, 2-methyl-1,3-propanediol and a combination thereof, wherein (i) when the total amount of plasticizer included in the film is less than 12 PHR, then the plasticizer blend comprises sorbitol, glycerol, and at least one additional secondary plasticizer;

(ii) when the total amount of plasticizer included in the film is at least 12 PHR and less than 20 PHR, then the plasticizer blend comprises sorbitol, glycerol, and at least one additional secondary plasticizer selected from diglycerol, trimethylolpropane and a combination thereof; and (iii) when the total amount of plasticizer included in the film is 20 PHR or greater, then the sorbitol comprises at least ⅓ of the total amount of plasticizer (by weight);

wherein the total amount of plasticizer included in the film is in a range of about 16.5 to 17.5 PHR, and the plasticizer blend consists essentially of sorbitol, glycerol, and trimethylolpropane.

330. The water-soluble film of claim 329, wherein glycerol is included in the film in an amount of at least 2.0 wt. %, based on the total weight of the film.

331. The water-soluble film of claim 329, wherein a film having the identical composition and a thickness of about 2 mil (about 0.05 mm), dissolves in 600 seconds or less in water at a temperature of 20° C. (68° F.) in accordance with MonoSol Test Method MSTM-205 after storing in contact with a harsh chemical oxidizing agent for 6 weeks at 23° C. and 35% relative humidity (RH).

332. The water-soluble film of claim 329, further comprising a filler, a surfactant, an anti-block agent or combinations of the foregoing.

333. The water-soluble film of claim 329, wherein the PVOH copolymer comprises a degree of hydrolysis in a range of 89 to 97.

334. The water-soluble film of claim 329, wherein the PVOH copolymer comprises a degree of hydrolysis in a range 90 to 96.

335. The water-soluble film of claim 329, wherein the anionic monomer unit further comprises vinyl acetic acid, maleic acid, monoalkyl maleate, dialkyl maleate, monomethyl maleate, dimethyl maleate, maleic anhydride, fumaric acid, monoalkyl fumarate, dialkyl fumarate, monomethyl fumarate, dimethyl fumarate, fumaric anhydride, itaconic acid, monomethyl itaconate, dimethyl itaconate, itaconic anhydride, alkali metal salts of the foregoing, esters of the foregoing, or combinations of the foregoing.

336. The water-soluble film of claim 335, wherein the anionic monomer unit comprises one or more of maleic acid, monoalkyl maleate, dialkyl maleate, monomethyl maleate, dimethyl maleate, maleic anhydride, alkali metal salts of the foregoing, esters of the forgoing, and combinations thereof.

337. The water-soluble film of claim 336, wherein the anionic monomer unit is selected from the group consisting of maleic acid, monomethyl maleate, dimethyl maleate, maleic anhydride, alkali metal salts of the foregoing, esters of the foregoing, and combinations thereof.

338. The water-soluble film of claim 329, wherein the PVOH copolymer comprises a degree of hydrolysis in a range of 87 to 98.

339. The water-soluble film of claim 338, wherein the PVOH copolymer has a degree of hydrolysis in a range of 94 to 98.

340. The water-soluble film of claim 339, wherein the PVOH copolymer has a degree of hydrolysis of 96.

341. The water-soluble film of claim 329, further comprising an antioxidant.

342. The water-soluble film of claim 341, wherein the antioxidant is selected from the group consisting of sodium metabisulfite, propyl gallate, citric acid, and combinations thereof.

343. A sealed article comprising the water-soluble film of claim 329.

344. The sealed article of claim 343, wherein the article is a vertical form, filled, and sealed article.

345. A sealed pouch comprising the film of claim 329 that encloses an oxidizing composition.

346. The sealed pouch of claim 345, wherein the oxidizing composition is a chlorinated or brominated composition.

347. The sealed pouch of claim 345, wherein the oxidizing composition comprises an oxidizing agent selected from the group consisting of sodium hypochlorite, calcium hypochlorite, lithium hypochlorite, dichloroisocyanuric acid, trichloroisocyanuric acid, trichloroisocyanurate (TC), salts and hydrates of the foregoing, 1,3-dibromo-5,5-dimethylhydantoin (DBDMH), 2,2-dibromo-3-nitrilopropionamide (DBNPA), dibromocyano acetic acid amide, 1-bromo-3-chloro-5,5-dimethylhydantoin (BCDMH), 2-bromo-2-nitro-1,3-propanediol, and combinations thereof.

348. The sealed pouch of claim 345, wherein the oxidizing composition comprises an oxidizing agent selected from the group consisting of trichloroisocyanurate, 1-bromo-3-chloro-5,5-dimethylhydantoin, and combinations thereof.

349. The sealed pouch of claim 345, wherein the pouch is a vertical form, filled, and sealed pouch.

350. The sealed pouch of claim 349, wherein the pouch has an interior volume of at least about 25 ml.

351. The sealed pouch of claim 349, wherein the pouch has a length of at least about 12.5 cm (about 5 inches).

352. The sealed pouch of claim 349, wherein the pouch has an interior volume of at least about 100 ml.

353. The sealed pouch of claim 349, wherein the pouch has an interior volume of at least about 150 ml.

354. The sealed pouch of claim 349, wherein the pouch has an interior volume of at least about 200 ml.

355. The sealed pouch of claim 349, wherein the pouch has an interior volume of at least about 250 ml.

356. The sealed pouch of claim 349, wherein the pouch has an interior volume of at least about 300 ml.

357. The sealed pouch of claim 349, wherein the pouch has a length of at least about 18 cm (about 7 inches).

358. The sealed pouch of claim 349, wherein the pouch has a length of at least about 23 cm (about 9 inches).

* * * * *